June 2, 1936.  H. HARVEY  2,042,843

WIRE TYING MACHINE

Original Filed Sept. 11, 1933   7 Sheets-Sheet 1

Inventor
Herbert Harvey
By Lyon & Lyon
Attorneys

June 2, 1936.  H. HARVEY  2,042,843
WIRE TYING MACHINE
Original Filed Sept. 11, 1933   7 Sheets-Sheet 2
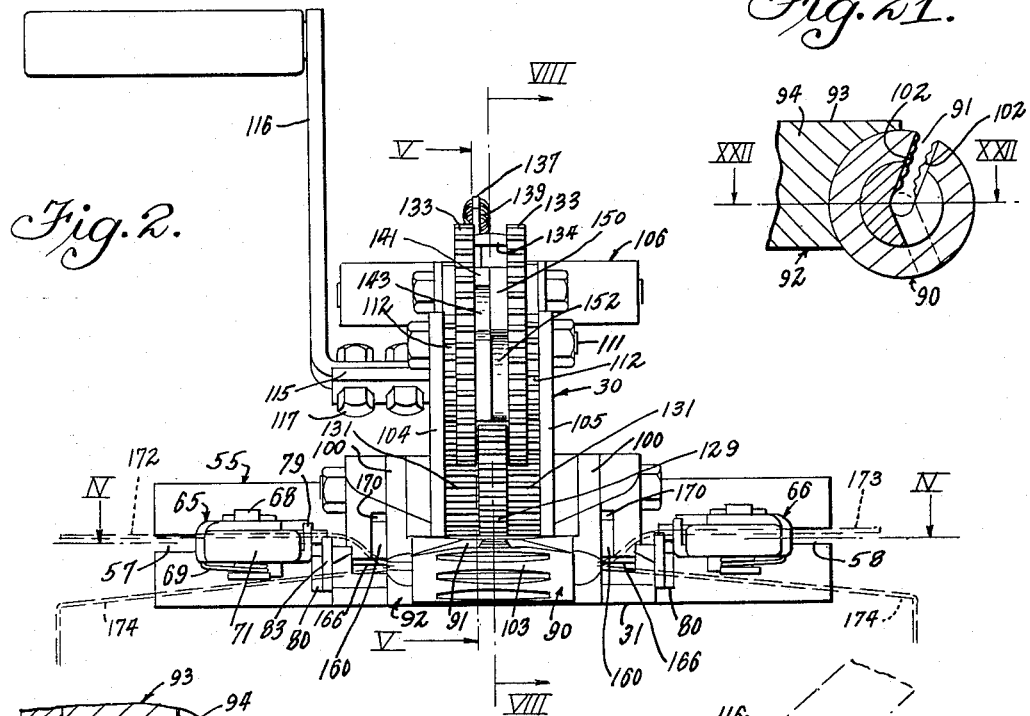
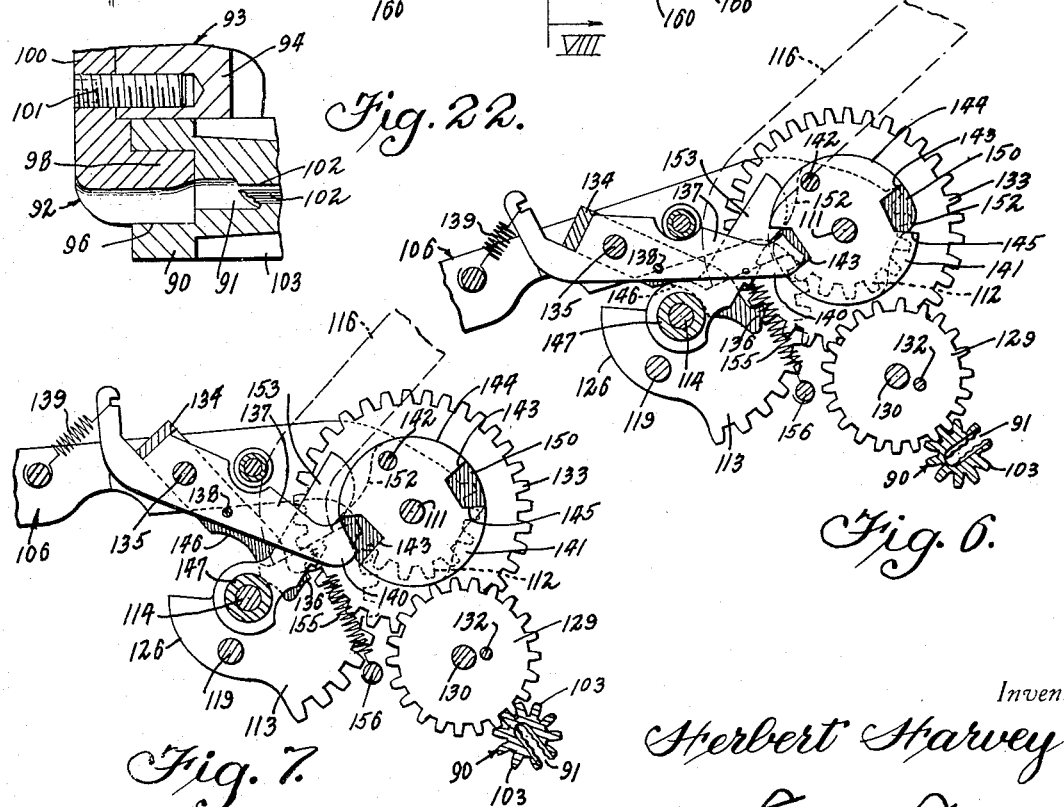

June 2, 1936. H. HARVEY 2,042,843
WIRE TYING MACHINE
Original Filed Sept. 11, 1933 7 Sheets-Sheet 3

Inventor
Herbert Harvey
By Lyon & Lyon
Attorneys

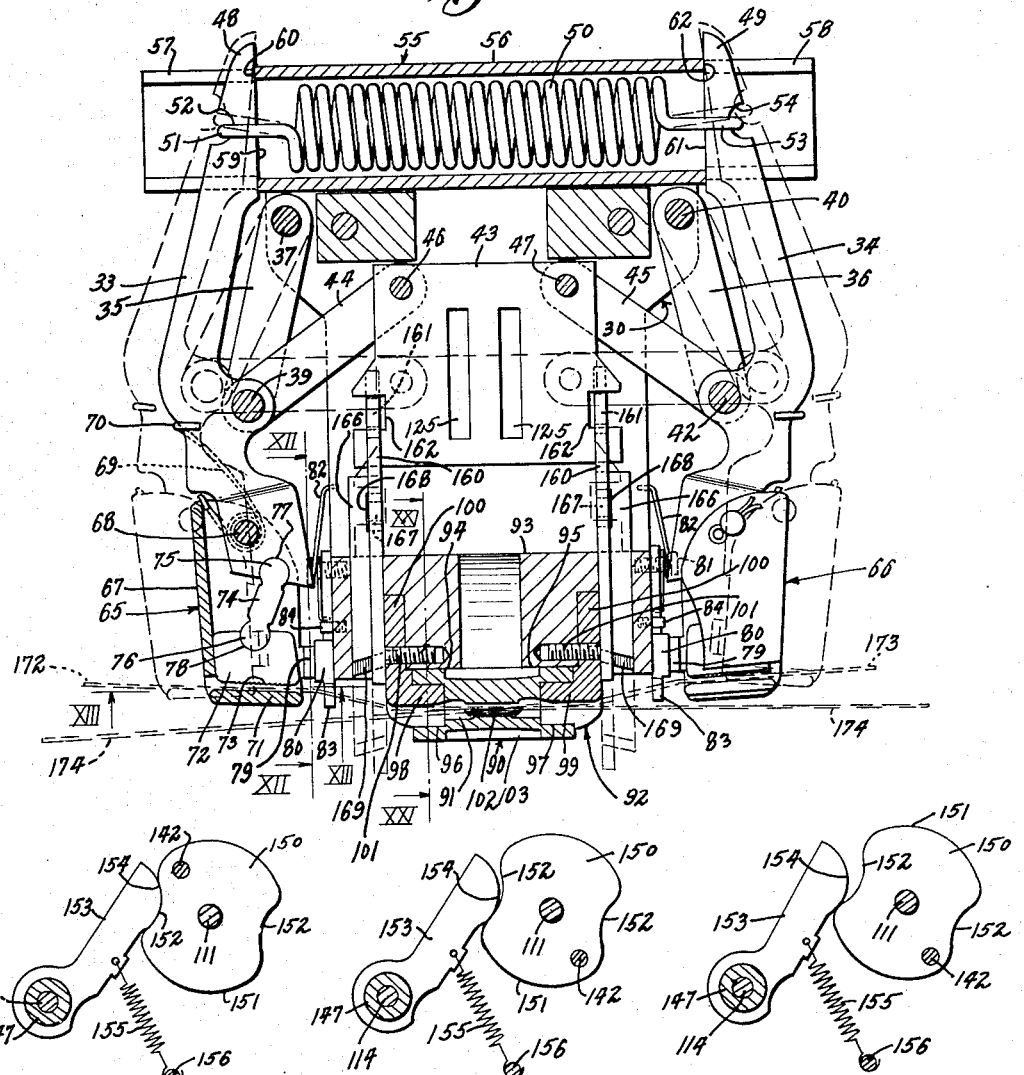
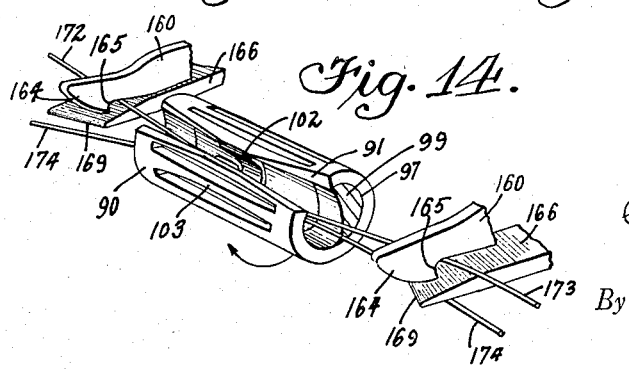

June 2, 1936.     H. HARVEY     2,042,843
WIRE TYING MACHINE
Original Filed Sept. 11, 1933     7 Sheets-Sheet 5

Inventor
Herbert Harvey
By Lyon & Lyon
Attorneys

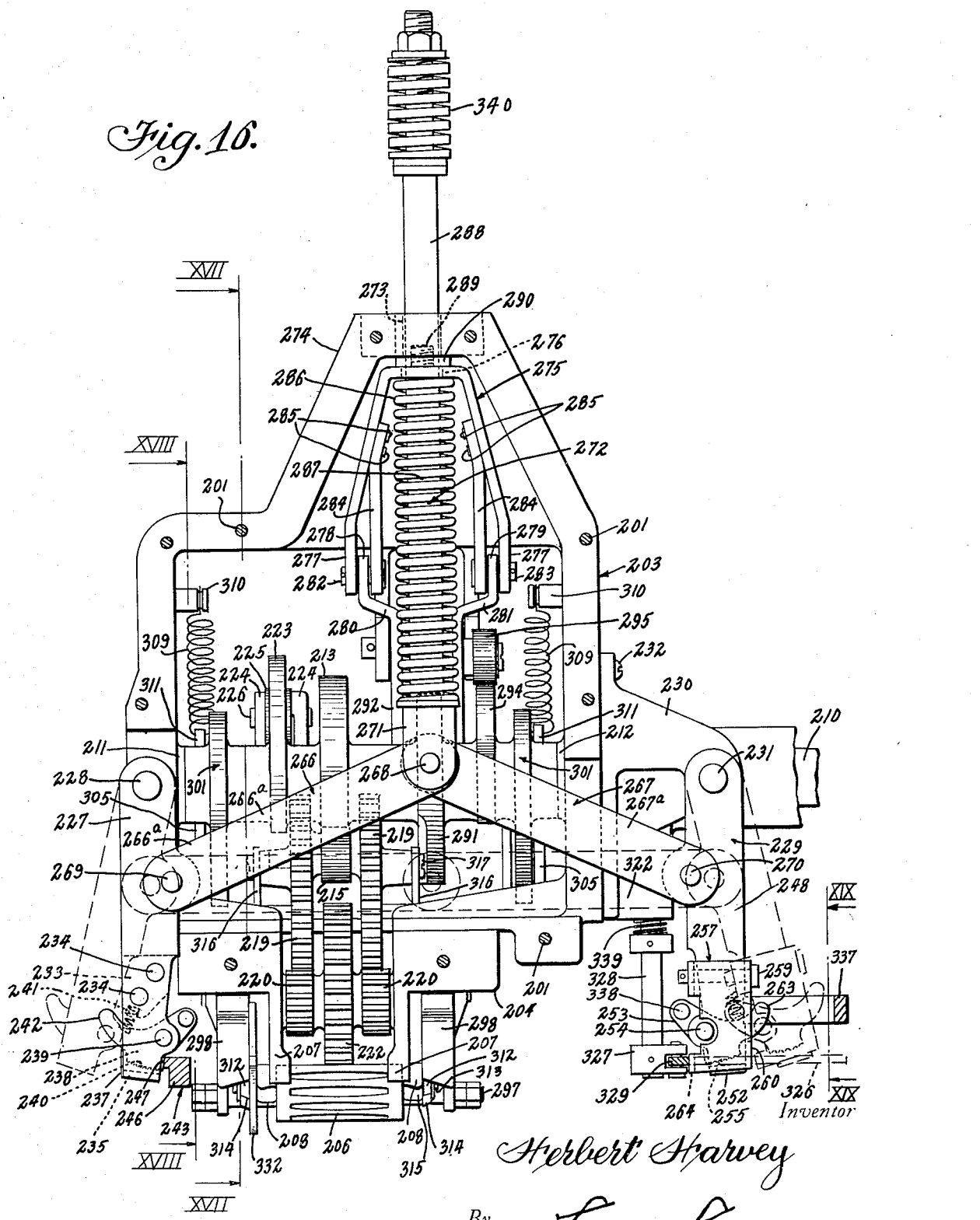

Inventor
Herbert Harvey
By Lyon+Lyon
Attorneys

Patented June 2, 1936

2,042,843

UNITED STATES PATENT OFFICE 2,042,843

WIRE TYING MACHINE

Herbert Harvey, Los Angeles, Calif.

Application September 11, 1933, Serial No. 688,925
Renewed November 4, 1935

32 Claims. (Cl. 140—93)

This invention relates to a wire tying machine operative for tensioning, tying and severing a placed wire about an object or plurality of objects.

One object of the invention is to provide a wire tying machine which is simple in design, and rapid and positive in operation.

A further object is to provide a portable wire tying machine adapted to be mounted upon the object to be tied and having a slotted wire twister pinion arranged whereby the slot thereof will be directed upwardly for facilitating the placing of the wire both into the twister pinion slot and about the object. By this arrangement the tie wire may be literally wrapped into the slot of the twister pinion during the placing of the wire about the article, thus rendering the wire placing operation easier and faster and with far less annoyance than in the old form of tying machines wherein the tie wire must be threaded into the horizontally directed jaws or guides and the twister pinion slot.

A further object is to eliminate the usual spaced wire receiving jaws or guides of the common unhandy forms of wire tying machines.

A further object is to provide a portable wire tying machine in which the twister means may have different positions for loading and discharging, whereby the tie wire may be wrapped directly into the twister means when located in the loading position and from which the completed tie may be ejected when located in the discharging position.

A further object is to provide a portable wire tying machine in which the slot of the twister means may be directed away from the article being tied during the tie wire placing operation and toward the article for discharging the completed tie.

A further object is to provide an internal-external sectoral bearing for operatively mounting the twister pinion upon the machine frame whereby the twister pinion slot may be directed upwardly during the wrapping or loading of the tie wire therein, and after the rotation of the twister pinion to form the tie the slot thereof may be directed downwardly for discharging the completed tie.

A further object is to provide means for returning the twister pinion slot from the discharge position thereof to the loading position wherein the twister pinion slot will again point upwardly and be in readiness for the next loading operation.

A further object is to provide a wire separating means adjacent each end of the twister pinion for limiting the length of twist placed in the tie wires.

A further object is to provide normally retracted wire separating means adjacent each end of the twister pinion and means for projecting the separating means between the placed wire strands, and after the completion of the tie for automatically retracting said means whereby the tie wire may be freely wrapped into the twister pinion slot during the next tying cycle.

A further object is to provide means for cutting the surplus wire from the tie.

A further object is to provide means associated with the separating means and operable therewith for latching the surplus wire strands in operative position upon the separating means and operative upon the completion of the tie for severing the surplus wire therefrom.

A further object is to provide cutting means cooperating with the machine frame for severing the surplus wire ends from the tie thereagainst.

A further object is to provide a pair of gripping jaws adjacent each end of the twister pinion and for providing means for moving said jaws for tensioning the tie wire about the article to be tied.

A further object is to provide a pair of oppositely disposed gripper levers, each being swingably mounted intermediate the ends thereof to the machine frame by an anchor link and connected to a reciprocating cross-head by means of suitable toggle links, and further providing a tension means for yieldingly retaining the rear ends of said gripper levers in their retracted positions and providing wire gripping jaws upon the forward end of each lever.

A further object is to provide a cross-head operable for actuating the wire tensioning, separating and cutting means.

A further object is to provide an actuating means operatively connected to the cross-head by a lost motion connection whereby the first operation of said means will actuate said cross-head for actuating the tensioning wire, separating and latching means and upon a second operation thereof for operating the wire twister means, and finally operable through the lost motion connection for returning the cross-head to its retracted position and thereby actuating the cutting means for severing the surplus wire ends and returning the tension and separating means to their initial positions.

A further object is to provide means operable upon the disengagement of the twister actuating means for returning the twister means from the discharging to the loading position thereof.

A further object is to provide means operable by the tie wire upon the completion of the placing operation thereof for actuating the one revolution clutch of a power driven machine into driving engagement.

A further object is to provide a pair of spaced wire separating means for limiting the length of the tie and operable upon the completion of the tie for ejecting the tie from the twister slot.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification and that variations therefrom in details of construction or arrangement of the parts may accordingly be effected and yet remain within the spirit and scope of the invention as the same is set forth in the appended claims.

In the drawings:

Figure 2 illustrates a front elevational view of Figure 1;

Figure 4 illustrates a sectional view taken substantially in the plane of line IV—IV of Figure 2;

Figure 6 illustrates a fragmental cross-sectional view of the twister pinion and operating mechanism therefor, corresponding to Figure 5 but showing the parts in the position they would assume at the completion of the twisting operation;

Figure 7 illustrates a view similar to Figure 6 but showing the position of the parts when the twister pinion has been rotated to the discharge position;

Figure 8 illustrates a fragmental sectional view taken substantially in the plane of line VIII—VIII of Figure 2, and depicts the position which these parts will assume when actuated to a position corresponding to Figure 5;

Figure 9 illustrates a view similar to Figure 8 but depicting the position these parts will assume when actuated to a position corresponding to Figure 6;

Figure 10 illustrates a view similar to Figure 8 but depicting the position these parts will assume when actuated to a position corresponding to Figure 7;

Figure 14 illustrates a fragmental perspective view of the twister pinion, separating means and cutter members;

Figure 16 illustrates a top plan view of Figure 15 with the top removed;

Figure 21 illustrates an enlarged fragmental sectional view taken substantially in the plane of line XXI—XXI of Figure 4; and Figure 22 illustrates a sectional view taken substantially in the plane of line XXII—XXII of Figure 21.

The features of this invention may be embodied in a portable wire tying machine arranged to be driven either manually or by power, or in a stationary type of machine likewise arranged to be either manually or power-driven.

In order to disclose the two different types of driving means adaptable to the tying machines of this invention, it has been deemed advisable to illustrate the portable machine with the manual drive and the stationary machine with the power drive.

The distinction between the portable and stationary wire tying machines of this invention simply means that the portable machine is ordinarily moved to the article to be tied, while in the case of the stationary machine the article is moved to the machine.

The portable machine is illustrated in Figures 1 to 13, 21 and 22, while the stationary machine is illustrated in Figures 15 to 20.

The portable wire tying machine, as illustrated in Figures 1 to 14, inclusive, may be of relatively light weight and of compact design in order to be easily and conveniently moved from one article to the next for the tying thereof.

Figure 3:
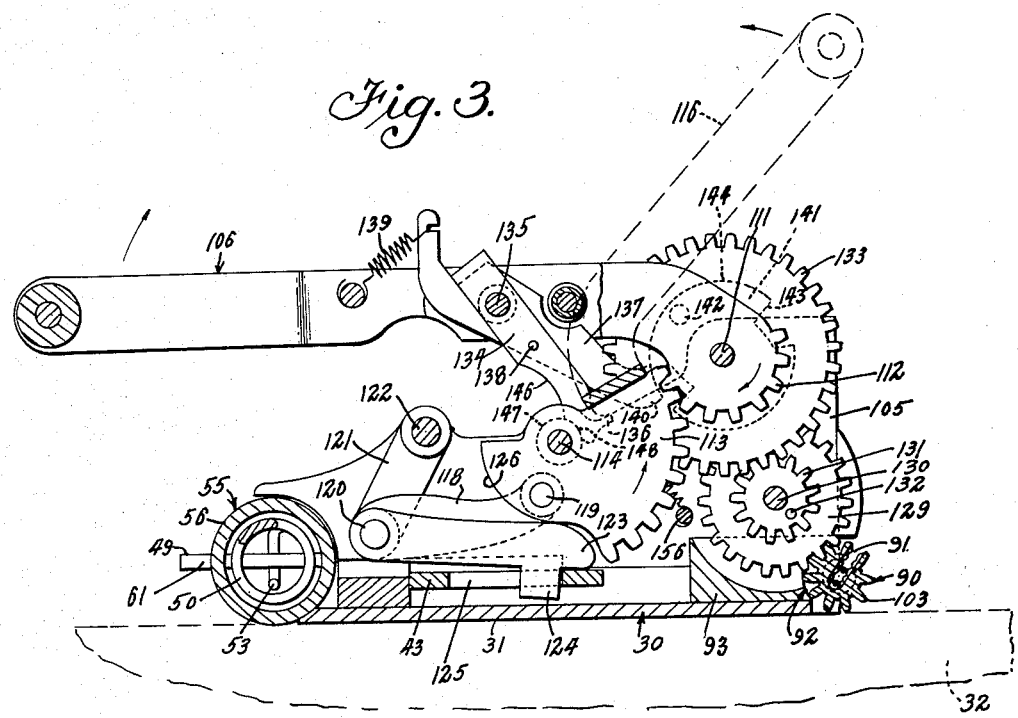
Figure 3 illustrates a sectional view taken substantially in the plane of line III—III of Figure 1.

The portable machine may be provided with a suitable frame 30 (note especially Figs. 2, 3 and 5), having a relatively flat bottom surface 31 adapted to be mounted upon the article to be tied, as for example the box or case 32 illustrated in part by the light broken lines in Figs. 2 and 3.

The frame 30 may be fabricated of metal plates or formed of one or more suitable castings and provided with the necessary bosses and flanges for the mounting thereon of the several operating portions of the machine.

A suitable wire tensioning means may be operatively mounted upon the frame and operable for tensioning the tie wire before the tying operation takes place.

The wire tensioning means may include a pair of spaced, oppositely disposed gripper levers 33 and 34 (Figs. 1 and 4) swingably mounted upon the frame 30, as by means of the anchor links 35 and 36.

The anchor link 35 may be pivotally mounted at one end, as by means of the pivot pin 37, to the frame bracket 38 and to the gripper lever 33, intermediate the end thereof, by means of the gripper lever pivot pin 39; and, likewise, the anchor link 36 may be pivotally mounted at one end, as by means of the pivot pin 40, to the frame bracket 41 and to the gripper lever 34, intermediate the end thereof, by means of the gripper lever pivot pin 42.

A cross-head 43 (Figs. 1, 3 and 4) may be slidably mounted in the machine frame so as to permit the cross-head to reciprocate back and forth. The forward motion of the cross-head from the full line position to the broken line position, as illustrated in Fig. 4, acts through toggle links 44 and 45 to swing the gripper levers apart and thus to tension the placed tie wire. The toggle links 44 may be pivotally connected at one end to the cross-head by the pivot pin 46 and to the gripper lever 33 by the pivot pin 39, while the toggle link 45 may be pivotally connected at one end to the cross-head by the pivot pin 47 and to the gripper lever 34 by the pivot pin 42. It may be well to note in Fig. 4 that when the cross-head has been moved to its forward position, as indicated in broken lines, that the pivot pins 39, 46, 47 and 42 will have been moved substantially into alignment and thus form a toggle locking effect which may be only broken by a rearward movement of the cross-head.

As may be observed most clearly in Fig. 4, the rear ends 48 and 49 of the gripper levers may be yieldingly retained in their retracted positions, as by means of the tension spring 50, which spring may be provided at one end with a suitable hook 51 of appropriate size and shape to operatively hook into the notch 52 formed in the end 48 of the gripper lever 33, while the other end of the tension spring may be provided with a hooked end 53 of appropriate size and shape to operatively hook into the notch 54 formed in the end 49 of the gripper lever 34. In order to prevent the tension spring from pulling the rear ends of the gripper levers closer together than desired, a floating stop means 55 may be provided. In this embodiment the floating stop means may include a tube 56 having an internal diameter of such sizes as to nicely receive therein the tension spring, and having at one end a longitudinal slot 57, through which slot the end 48 of the gripper lever 33 may be slidably mounted, while the other end of the tube 56 may be provided with a corresponding longitudinal slot 58, through which the end 49 of the gripper lever 34 may be slidably mounted. The gripper lever 33 may be provided, at the end 48 thereof, with an abutting face 59 for engaging the end 60 of the tube slot 57, and, likewise, the gripper lever 34 may be provided, at the end 48 thereof, with an abutting face 61 for engaging the end 62 of the tube slot 58. It may be well to note at this point that neither the tension spring 50 nor the tube means 56 are directly fastened to the frame and, therefore, are free to float back and forth in accordance with the various movements of the gripper levers during the tensioning operation. This floating action of the rear ends of the gripping levers is one of the important features of this invention and a few of the benefits derived therefrom will be pointed out, as, for example, each gripper lever may take up an unequal amount of slack wire during the tension operation without causing bodily movement of the entire machine along the surface of the article being tied, as is the case of the ordinary forms of portable tying machines. In other words, the machine remains as placed upon the article and does not crawl thereover during the tensioning operation. A further feature obtained by this arrangement is the flexibility of the tensioning mechanism, as, for example, should the end of the tie wire held by the gripper lever 33 have but very little slack to be taken up during the tensioning operation, this slack will be taken up and the wire tensioned during the initial movement of the gripper lever; whereupon during the balance of the outward movement of the gripper lever the wire gripping end thereof may remain relatively stationary while the rear end may be forced outward, and due to its connection with the tension spring the motion thereof may be transmitted through said spring to cause the rear end 49 of the gripping lever 34 to swing inwardly about the pin 42 as a pivot and to thus cause a more rapid outward movement of the wire gripping end thereof to more rapidly take up the slack in the end of the tie wire carried thereby until both ends of the tie wire will have been equally tensioned to a predetermined degree, as determined by the strength of the tension spring 50.

In those cases in which the slack in each wire end is taken up and the tie tensioned during the initial movement of each gripper lever, the rear end of each of said levers may be moved outwardly, while the gripping ends thereof may remain relatively stationary and the tension spring yielding to accommodate such movement, and also acting to predetermine the tension placed in the tie wire. Upon the completion of the tying operation and the releasing of the tension in the gripped ends of the tie wire due to the severing thereof from the tie, the tension spring will act to return the rear ends of the gripper levers into abutting engagement with the tube slot ends, and thereby the entire tensioning mechanism to its initial starting position.

The forward end of each gripper lever may be provided with suitable means for gripping or operatively carrying the respective ends of the tie wire. As each of these wire gripping means are substantially alike, one only will be described. It should be appreciated, however, that the two gripping means are reversely arranged so as to function in opposite directions.

The wire gripping means carried by the forward end of the gripper lever 33, into which the initial end of the tie wire is placed, will be referred to as the first wire gripper 65, while the wire gripping means carried by the forward end of the gripping lever 34, into which the tie wire is placed after being wrapped around the article and into the wire tying means, will be referred to as the second wire gripper 66. The first wire gripper 65 has been selected for the purpose of description and therefore, has been illustrated in detail in Figs. 4 and 13.

The first wire gripper may include a shoe 67 of more or less U section, of such width as to nicely fit over the forward end of the gripper lever 33 and pivotally mounted thereon by means of a suitable pivot pin 68. A suitable means, such as the torsional spring 69, may be provided for yieldingly urging the gripper shoe toward the tying mechanism of the machine, or, as illustrated in Fig. 4, in a counter-clockwise direction of rotation.

The torsional spring may be coiled loosely around the pivot pin 68 and have the end 70 thereof acting against the gripper lever and the other end thereof acting against the shoe.

The forward end of the lower side of the shoe 67 may be extended beyond the upper side thereof and bent upwardly to form the wire gripping anvil 71. A wire gripping die 72 may be slidably mounted within the U portion of the shoe and provided with a wire gripping surface 73, which surface may be serrated, if desired. A thrust link 74 may be provided for operatively coupling the forward end of the gripping lever 33 with the wire gripping die 72. As illustrated, the thrust link may be provided at the opposite ends thereof with the sectoral heads 75 and 76, while the adjacent edges of the gripping lever and die may be provided with appropriate sectoral sockets 77 and 78 for operatively receiving the sectoral heads of the thrust link.

The sectoral socket 77 of the gripping lever may be located at a point below and to one side of the shoe pivot pin 68, whereby as the shoe is rotated in a counter-clockwise direction, as viewed in Fig. 4, the centers of the shoe pivot pin and the two thrust link sectoral joints will be brought into closer alignment and thereby thrust the die toward the shoe anvil 71 and thereby securely clamp a tie wire placed therebetween.

By rotating the gripper shoe 67 in a clockwise direction, as viewed in Fig. 4, the die 72 will be moved away from the anvil 71 to release the tie wire end previously gripped therein. For the convenience of placing the initial tie wire end into the gripper, means may be provided for latching the shoe in open position, which means may include providing the shoe with a side flange 79 (note especially Fig. 13), and pivotally mounting a latch lever 80 to the machine frame, as by suitable screw means 81 (Fig. 12), and providing a suitable spring means, such as the torsional spring 82, for yieldingly maintaining the latch lever in position to engage the shoe flange 79 and thereby to retain the gripper in open position. The latch lever 80 may be provided with an upwardly turned section 83 positioned to be engaged by the tie wire, during the placing thereof, to trip the latch lever sufficiently to release the flange 79 of the gripper shoe, whereupon the torsional spring may act to rotate the gripper in a counter-clockwise direction to bring the gripper into clamping engagement with the placed tie wire end.

The pull of the tie wire upon the gripper will tend to rotate the gripper shoe in a counter-clockwise direction, as viewed in Fig. 4, and thus increase its clamping action upon the held wire. In other words, the harder the wire is pulled, the greater will be the clamping effect of the gripper.

As soon as the gripper moves outwardly at the start of the tensioning operation, the torsional spring 82 will act to return the latch lever 89 to its initial position, and when the gripper returns after the completion of the tying operation the flange 79 thereof will again engage the latch lever, whereupon the gripper shoe will be rotated in a clockwise direction, as viewed in Fig. 4, to open the gripper not only for releasing the remnant end of the tie, but also for receiving the tie wire for the next tying operation.

A stop pin 84 (Figs. 4 and 12) may be provided for limiting the upward motion of the latch lever 89 under the influence of the torsional spring 82.

It is a further feature of this invention to mount the twister pinion upon the machine frame whereby the slot thereof may be pointed upwardly to directly receive the tie wire strands during the wire placing operation, and whereby upon completion of the tie the twister pinion slot may be directed downwardly for discharging the completed tie.

In the ordinary portable wire tying machines the slot of the twister pinion is directed in a horizontal plane and is flanked upon each side with a wire guiding member, each having a horizontal slot in line with the twister pinion slot. This arrangement is unhandy and renders the wire placing operation relatively slow and awkward, as each strand of the tie wire must be separately threaded twice into the guide and twister pinion slots.

In the portable wire tying machine of this invention, wherein the twister pinion is so mounted that the wire receiving slot thereof is directed upwardly and in which the bothersome ordinary wire guides have been eliminated, the tie wire may be easily and quickly wrapped into the upwardly directed twister pinion slot during the placing of the tie wire. In other words, the twister pinion slot is retained substantially in the same plane as that of the wire being wrapped around the bundle and not at right angles thereto, as in the case of the old forms of portable tying machines. Thus, the tie wire strands are wrapped directly into the twister pinion slot and it is not necessary to thread each strand therein by moving the wire at right angles to the normal wrapping plane thereof.

To mount the twister pinion 90 upon frame 30, to permit the slot 91 thereof to be pointed upwardly in substantial alignment with the plane of the wrapping operation of the tie wire and to be directed downwardly toward the bundle for discharging the completed tie, a special type of bearing had to be developed, which bearing will be referred to herein as an internal-external sectoral bearing, or as a sectoral bearing.

A sectoral bearing 92 may be provided for supporting each end of the twister pinion. As may be seen most clearly in Figs. 3 and 4, the sectoral bearing may include an external sectoral bearing block 93, fastened to the machine frame 30 by suitable screw means, not shown.

In this instance, the external sectoral bearing block may be provided with external sectoral bearing surfaces 94 and 95, that is, one bearing surface for each end of the twister pinion. The external sectoral bearing surfaces may be of such shape as to effectively journal the peripheral surface of the twister pinion. It is to be understood that a separate external sectoral bearing block may be used for supporting each end of the pinion, but the single block gives a more stable mounting.

The end sections of the twister pinion may be counterbored, as at 96 and 97, to operatively receive therein the internal sectoral bearings 98 and 99, respectively. Each of the internal sectoral bearings may be suitably mounted upon the external sectoral bearing block by providing each of the internal bearings with an arm or side plate 100 and fastening the plate to the external bearing block by suitable screw means 101.

The twister pinion slot 91 is illustrated in Fig. 21 in the loading position by full lines, that is, in position to have the tie wire strands wrapped therein during the wire placing operation, while by broken lines the twister pinion slot is illustrated in the discharging position. The loading and discharging positions of the twister pinion may be 180° apart, but, as illustrated, these positions are somewhat less. It will be readily appreciated that the twister pinion supporting bearings must not overlie the twister pinion slot when said slot is located at either its loading or discharging positions, and, therefore, the pinion bearings must be cut away for at least an amount equal to the sector traversed by the pinion slot while rotating from the discharge position to the loading position. The twister pinion may be very satisfactorily supported in the sectoral bearings of this invention whereby the outer peripheral section thereof between the loading and discharge positions of the twister slot may be fully exposed. As may be further noted, the internal sectoral bearings overlie the ends of the pinion and form with the external sectoral bearing block sectoral grooves, in which sectoral grooves the tubular ends of the pinion are operatively journalled. One advantage resulting from the stud or internal sectoral bearings overlying the pinion ends and thus forming the sectoral grooves is that the ends of the pinion may thrust against the bottom surfaces of the grooves and thereby be held in correct longitudinal alignment, or, if preferred, the inner ends of the sectoral stud bearings may engage the inner face of the counterbored sections of the pinion and thereby maintain the pinion correctly positioned.

The twister pinion slot 91 may be necked in, as at 102, whereby the tie wire strands wrapped therein will be rotated during the turning of the pinion, while the remaining portions of the slot may be wide enough to loosely accommodate the twisted portions of the tie.

Intermediate the ends thereof the twister pinion may be provided with gear teeth 103.

Suitable means may be provided for rotating the twister pinion a given number of revolutions for twisting the tire wire strands wrapped therein into a secure knot or tie, and finally for stopping the pinion at the discharging position for unloading or ejecting the completed tie therefrom, and finally for returning the pinion to its loading position. Any suitable pinion driving means may be provided for this purpose; however, it is advantageous to provide a driving means which may be operable for maintaining the twister pinion slot in loading position, and, after the tie wire has been placed and tensioned about the object, for rotating the pinion a given number of turns in one direction and for stopping the rotation of the pinion after the slot thereof will have rotated about a third of a revolution beyond the discharging position to provide an appropriate amount of overtwist in the tie, and thereafter for rotating the pinion in the reverse direction until the pinion slot thereof will have reached the discharge position, and then again reversing the direction of rotation of the pinion and rotating the same until the twister slot will have returned to the loading position.

A separate actuating means may be provided for the tensioning, separating, twisting and cutter means. However, for the sake of ease of operation and speed in forming the tie it is advantageous to provide a single means for actuating each of the above means in correctly timed relationship. Such a driving or actuating means is disclosed herein. The driving means may be operatively supported upon or between the two spaced side plates 104 and 105, which side plates may be suitably mounted upon or formed integral with the frame.

A suitable operating handle 106, formed of a pair of spaced blades 107 to which the handle structure 108 may be fastened as by suitable bolt means 109 and 110, may be operatively journalled upon the transverse shaft 111 carried by the side plates 104 and 105. The journalled end of each of the handle blades 107 may be provided with a gear quadrant 112 concentric with the axis of the transverse shaft 111.

Means may be provided for actuating the tensioning means during the forward swing of the operating handle, which means may include a pair of auxiliary quadrant gears 113 operatively journalled upon the stop shaft 114, and meshing with the operating handle gear quadrants 112.

Figure 1:
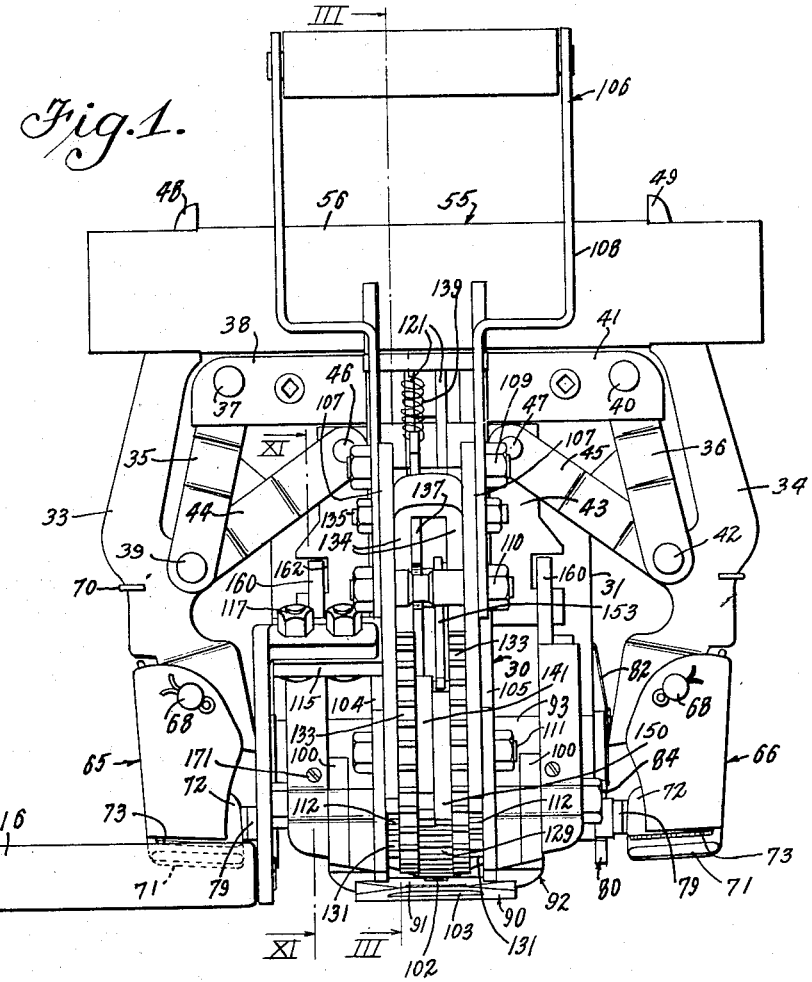
Figure 1 illustrates a top plan view of a portable manually operated embodiment of the invention.
Figure 12:
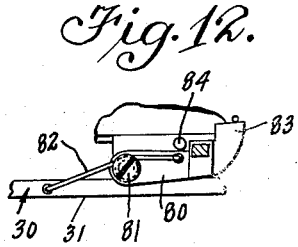
Figure 12 illustrates a fragmental sectional view of the first gripper trip mechanism as taken substantially in the plane of line XII—XII of Figure 4.
Figure 11:
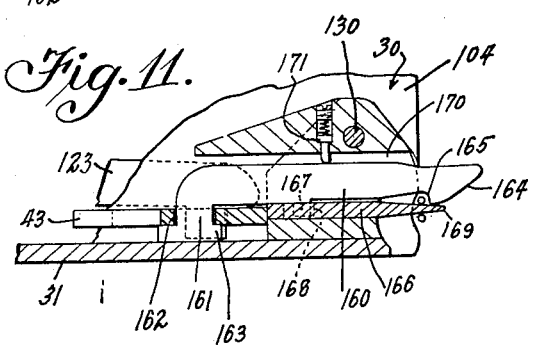
Figure 11 illustrates a fragmental sectional view of the wire separating and cutting means as taken substantially in the plane of line XI—XI of Figure 1.
Figure 13:
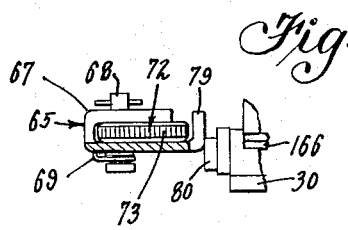
Figure 13 illustrates a fragmental sectional view of the first gripper and tripping mechanism therefor as taken substantially in the plane of line XIII—XIII of Figure 4.

The gear quadrant 113 located upon the left side of the machine, as viewed in Figs. 1 and 2, may be provided with an outwardly projecting arm 115, to which arm an auxiliary operating handle 116 may be mounted, as by suitable bolt means 117. The auxiliary handle may be shorter than the main operating handle 106, and by making the quadrant gears 113 substantially twice the diameter as that of the gear quadrants carried by the operating handle 106, the auxiliary handle will swing through substantially one-half the arc traversed by the main operating handle 106. It is to be understood that the auxiliary handle may be dispensed with, if desired, in which case the operator may place one hand upon the tension spring tube 56, while his other hand is operating the main lever 106. One of the disadvantages of this arrangement results in the loss of effort expended by the operator in pressing upon the spring tube to retain the machine in tying position.

By the use of the auxiliary handle arranged as above described, so as to swing through substantially one-half the arc traversed by the main handle, the effort expended by the operator against the auxiliary handle not only acts to assist in the tensioning and tying operations, but will also act to retain the machine in the tying position. Also, as the two handles swing in opposite directions, due to their gear connections, the operator has the advantage of a bracing effect while swinging these handles. This two-handle arrangement makes the operation of the machine easy and rapid.

Figure 5:
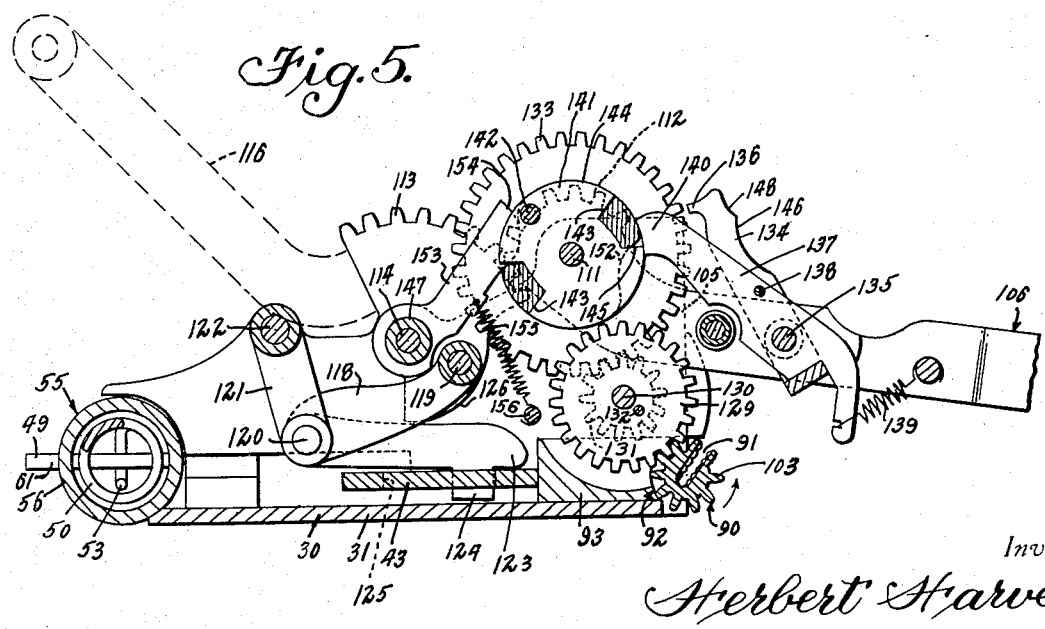
Figure 5 illustrates a sectional view taken substantially in the plane of line V—V of Figure 2.

The quadrant gears 113 may be coupled to the reciprocating cross-head 43 by any suitable means, as, for example, the system of links and levers, as illustrated in Figs. 3 and 5, wherein the coupling means may include a connecting link 118 for each quadrant gear 113, and operatively connected thereto, as by means of the pivot pins 119, while the opposite or rear end of each connecting link 118 may be journaled upon a suitable pivot pin 120 carried by the free ends of a pair of levers 121, which levers may be journaled upon the cross-shaft 122 extending transversely through the spaced side plates 104 and 105. A pair of dogs 123 may be each journaled at one end upon the pivot pin 120 and arranged to overlie the reciprocating crosshead 43, whereby the downwardly projecting tongue 124 of each dog may ride in one of the elongated slots 125 formed in the cross-head. The cross-head slots 125 may be considerably longer than the length of the tongues 124, so as to provide a predetermined amount of lost motion between the dog and cross-head, thus providing a lost motion means. The advantage of providing a lost motion means between the actuating mechanism and the cross-head is to permit a sufficient return swing of the operating handle to securely twist the wire tie before releasing the tensioning means and before causing the severing means to act.

The two dogs 123 may be positioned to travel back and forth directly beneath the quadrant gears 113, whereby the concentric cam surface 126 formed upon each quadrant gear may act to retain the dogs in operative relation with the cross-heads and thus prevent the tongue of each dog from inadvertently lifting out of its respective cross-head slot.

During the forward swing of the main operating handle 106 from the position, as illustrated in Fig. 3, to the position, as illustrated in Fig. 5, the cross-head 43 will be shifted from its full rearward position to its full forward position, as may be observed in these same figures; or, as may be noted from Fig. 4, the cross-head will be shifted from its full line to its broken line position. The forward motion of the cross-head 43 from its full line position to its broken line position, as viewed in Fig. 4, may cause the gripper levers 33 and 34 to be moved from their full to their broken line positions, as illustrated in this same figure, and thereby tension the placed tie wire. The motion of the cross-head is transmitted to the gripper levers through the toggle levers 44 and 45, and as these toggle levers will be brought into substantial alignment at the completion of the forward motion of the cross-head a toggle locking action will be formed. The tensioning means due to this toggle locking action will remain in its extended position until the cross-head will have been moved rearwardly sufficiently to disrupt this toggle locking effect. During the initial return swing of the handles the tongues 124 of the dogs 123 will travel along the cross-head slots 125. It is during this initial return swing of the handles that the twisting means are brought into play to form the tie. As the return swing of the handles continues, the tongues 124 will finally engage the rear ends of the cross-head slots to rearwardly move the cross-head until the toggle locking effect will have been disrupted, whereupon the tension spring 50 will cause the cross-head and tensioning means to snap back into their initial starting positions.

As has been described during the first swing of the operating handles, the tensioning means are brought into play while the twisting means remain idle, while during the initial return swing the tensioning means, due to the lost motion connection, remains idle while the wire twisting means are brought into play.

The means for driving the twister pinion during the return swing of the handles may include providing the periphery of the twister with suitable gear teeth 103 and providing an appropriate train of gears to form an operative connection between the operating handles and the twister pinion. The train of gears may include a pinion driver 129 in mesh with the pinion gear teeth 103 and journaled upon a shaft 130 carried by the side members 104 and 105. Journaled upon the shaft 130 and upon each side of the pinion driver 129 may be a driven pinion 131 (Figs. 3 and 5). The pinion driver 129 and the two driven pinions 131 may be keyed together so as to rotate as a unit, as by a suitable driving pin 132. A pair of main driving gears 133 may be journaled upon the transverse shaft 111 and arranged to mesh with and drive the pinions 131, whereby any motion imparted to the main driving gears will be transmitted through the gear train and thereby rotate the wire twisting pinion 90. The several gears included in the train may be proportioned to impart substantially four complete revolutions of the twister pinion for each half revolution of the main driving gears 133. The main operating handle 106 is also journaled upon the transverse shaft 111, and means may be provided for maintaining the operating handle 106 free of the main driving gears 133 during the initial forward swing thereof but operable for connecting the handle with these gears so as to rotate the said gears and thereby the twister pinion upon the return swing of the handle. This control means may include pivotally mounting upon the operating handle a pair of pawls 134 by means of the pivot pin 135. If preferred, the two pawls may be formed of a single piece of material bent to substantially a U shape (note Fig. 1), whereby the two parallel legs of the U form the two pawls and are thus spaced apart so as to engage the teeth of the main driving gears 133. The free end of each pawl may be provided with a tooth 136 (Fig. 5), shaped to nicely mesh with the gear teeth of the main driving gears 133. By this arrangement the main driving gears may be positively rotated in either direction whenever the pawls are swung into operative engagement with the gears. A cam blade 137 may be journaled upon the pivot pin 135 and keyed to one or both pawls for controlling the action of the same, as by means of the pin 138. A spring means 139 (Fig. 3) may be provided for yieldingly urging one end of the cam blade toward the handle 106, and thereby yieldingly urging the other or cam end 140 of the blade into operative engagement with the twister control cam 141 (Figs. 5, 6 and 7). The twister control cam 141 may be journaled upon the transverse shaft 111 between the two main driving gears 133 and keyed thereto as by means of the driving pin 142 and provided with diametrically opposed cam notches 143 of such shape as to receive the end 140 of the cam blade 137. During the forward swing of the operating handle 106 the end 140 of the blade 137 slides over the concentric peripheral cam surface 144 of the twister control cam 141 to retain the tooth 136 of each pawl free from the gear teeth of the main driving gears, and, therefore, the twister mechanism may remain idle during this initial motion of the operating handle. As may be observed from Fig. 3, the end 140 of the blade 137 will fall into and ride out of the cam notch 143 during this forward swing of the handle, whereby the pawls 134 will be brought into engagement with the main driving gears, but as the clockwise face 145 of the cam notch is provided with a suitable slope and due to the angular relation of the cam blade 137 thereto the end thereof will ride out of the notch before the pawls will have had time to rotate the main gears.

Upon the return swing of the main operating handle 106 from the position, as illustrated in Fig. 5 to that of Fig. 6, the end 140 of the cam blade 137 will again drop into the cam notch 143, due to the action of spring 139, whereupon the pawls 134 will be brought into driving engagement with the main driving gears 133 for rotating the gears for substantially a half revolution, and thereby through the gear train rotating the wire twister pinion 90 substantially four full turns.

To more securely cinch the tie and to render the ejection thereof more easy from the twister pinion slot, it may be advantageous to slightly overtwist the tie and thereafter return the twister pinion slot to its discharging position. The twisting action is clearly depicted in the drawings wherein, in Figures 3 and 5, the pinion slot is directed upwardly in its initial loading position, in Fig. 6 the pinion slot is illustrated at the completion of the twisting operation after having rotated substantially four complete turns in a counter-clockwise direction, as viewed in these figures, while in Figure 7 the twister pinion slot is illustrated as pointing downwardly and represents the discharge position thereof. The rotation of the twister pinion from its position, as illustrated in Fig. 6 to that of Fig. 7, is in clockwise direction, and this amount of return travel represents the amount of overtwist given to the tie, which in this instance is substantially a quarter of a turn.

In order to rotate the main driving gears 133 to the position, as illustrated in Fig. 6, so as to give the tie a predetermined amount of overtwist, and to positively rotate the main gear in the reverse direction and thereby rotate the twister pinion to the discharge position of Fig. 7, a portion of the rear face of each pawl 134 may be provided with a cam surface 146 of such shape as to cam over the stop rollers 147 journaled upon the stop shaft 114, whereby as the operating handle 106 is swung from the position thereof, as shown in Fig. 6 to that of Fig. 7, the pawls 134 due to their engagement with the cam surfaces thereof with the stop rollers 147 will maintain the pawls in driving engagement with the main gears 133, but as soon as the cam surface 146 lifts above the stop rollers the pawls will be free to be lifted out of engagement with these gears due to the action of the end 140 of the cam blade 137 riding out of the cam notch 143 on to the peripheral cam surface 144 thereof, whereupon any attempt to swing the operating handle in a counter-clockwise direction or downwardly, as viewed in Fig. 3, will bring the stop surface 148 of each pawl 134 into engagement with their respective stop rollers 147 and thus prevent such movement, and to thus retain the operating handle in its initial operating position.

Means may be provided for yieldingly retaining the twister pinion in its loading position, as shown in Fig. 3, in which position the wire twisting slot thereof will be directed upwardly so as to readily receive the wire strands as the same are being placed about the article to be tied. These same means may also be utilized for returning the twister pinion from the discharging position, as illustrated in Fig. 7, in which position the twister pinion slot may be directed downwardly to the loading position of Fig. 3.

The twister pinion yieldable retaining means may include journally mounting a retaining cam 150 upon the transverse shaft 111, preferably between the main driving gears 133 and next to the twister control cam 141, and may be keyed to rotate with the driving gears and control cam by the same driving pin 142 previously referred to. The retaining cam 150 may have a concentric peripheral surface 151, in which there may be formed a pair of diametrically opposed well-rounded depressions 152 (note Figs. 8, 9 and 10). An appropriately formed cam lever 153 may be journaled upon the stop shaft 114 and the rounded nose 154 thereof may be yieldingly urged into operative engagement with the periphery of the cam as by a suitable spring means 155 acting between the lever and a pin 156 carried by the machine frame.

The rounded nose 154 of the cam lever nicely seats in one or the other of the well rounded depressions 152 of the retaining cam 150 and thus yieldingly retains the main driving gears 133 in a predetermined position to in turn, through the gear train, maintain the twister pinion in its loading position. In Fig. 8 the cam lever is shown seated in the cam depression and represents the position of these parts in Figs. 3 and 5. In Fig. 9 the cam lever and retaining cam are shown after the driving gears have been rotated nearly half a turn, thereby turning the twister pinion through nearly four complete turns, and illustrates these parts in the positions they assume in Fig. 6. In Fig. 10 the retaining cam 150 has been rotated in a clockwise direction, which rotation takes place during the return movement of the twister pinion from the overtwist position of Figs. 6 and 9 to the discharge position of Fig. 7. During this rotation of the cam the rounded nose 154 of the cam lever 153 will ride up and nearly out of the depression, and it is just at this point that the pawls 134 are released from driving engagement with the main driving gears, whereupon the cam lever 153 due to the action of spring 155 will act to rotate the retaining cam in a counter-clockwise direction, as viewed in these figures, until the rounded nose 154 of the cam lever again seats in the bottom of the cam depression 152. The rotation of the cam drives the main driving gears 133 through the driving pin 142 to in turn rotate the twister pinion back to its initial loading position.

A further and important feature of this invention is the provision of the wire separating means located adjacent each end of the wire twister for limiting the length of the twist placed in the tie wires during the rotation of the twister. In the preferred design, the separating means may be made retractable in order to remove these separating means from the path of the wire during the placing of the same in the twister and about the article to be tied, so as to greatly facilitate this operation and to thus speed up the making of the tie. If desired, a wire severing means may be associated with each of said separating means.

As illustrated in Figs. 1, 4, 11 and 14, the wire separating and severing means may include a pair of spaced severing blades 160, one positioned adjacent each end of the wire twister 90 and slidably mounted in the frame so as to be retractable therein or protrusive therefrom. The rear end of each severing blade may be suitably coupled to the reciprocating cross-head 43, as by means of the downwardly bent portion 161 (Fig. 11) adapted to operatively fit in the slot 162 formed in each side of the cross-head. The terminal portion of each downwardly bent portion 161 may be provided with a head 163 for supporting the forward end of the cross-head. The forward end of each severing blade may be gradually tapered as to 164 so as to ride over the placed tie wire during the outward movement thereof, and recessed as at 165 so as to hook over the tie wire. During the inward movement of the severing blade the hooked portion of each blade will sever one of the surplus ends of the tie wire against the adjacent sides of the machine frame.

The wire separating means may include a pair of flat plates 166, one positioned adjacent each end of the twister 90 and preferably positioned directly below the severing blades, and each separator plate may be slidably mounted in the frame so as to be, like the severing blades, retractable therein or protrusive therefrom. In fact, if desired, the separating members 166 may be actuated in and out by the severing blade. For this purpose, each of the severing blades may be provided with a depending tooth 167 (Figs. 11 and 4) loosely projecting into a suitable slot 168 formed in its respective separating member, whereby as each severing blade is moved forwardly by the cross-head the corresponding separating member will be likewise moved forwardly into its wire separating positions, and during the rearward movement of the cross-head the severing blades will likewise be moved rearwardly to sever the tie wire, and due to their connection with separating means the separating means will be moved into their retracted positions.

It is to be understood that, if preferred, the separating means may be directly actuated by the cross-head. Also, the forward end of each separating member 166 may be tapered, as at 169, in order to facilitate the sliding thereof between the strands of the placed tie wire.

It is desirable to arrange the frame slots 170 (Fig. 11), through which the severing blades operate slightly higher than the full height of the blades in order to permit the blades to lift over the tie wire during its forward movement thereof, and also to provide means for yieldingly urging the forward ends of the severing blades into engagement with the forward ends of the separating members to insure the positive latching of the cutting blades over the placed tie wires. This yielding means may include a spring weighted plunger 171 operatively acting upon the top edge of each blade. However, any other suitable yielding means may be provided.

The operation of the portable machine may be summarized briefly as follows. The machine may be placed upon the article, at the location at which the tie is to be made. A suitable length of tie wire may be unwound from the usual supply of coiled wire, and, if desired, cut from the supply and then the free end 172 thereof may be inserted in the first gripper 65 and securely clamped therein upon the tripping of the latch lever 80, as has been previously described. Next, the tie wire may be wrapped into the twister pinion slot, then wrapped about the article to be tied, and again into the twister pinion slot, and finally into the second gripper 66 wherein the final end 173 of the tie wire will be securely gripped as the latch lever 80 for this gripper is tripped during the placing of the wire therein.

The wire placing operation is greatly facilitated due to the retraction of the tie wire separating and severing means out of the path of the tie wire during the placing thereof. This feature eliminates the horizontally directed wire guides of the ordinary forms of portable tying machines, and, therefore, the time and attention of the operator in threading the tie wire into such guides twice during the placing of the wire about the article. In the invention, there are no horizontally directed wire guides, and due to the upwardly directed twister slot the tie wire is wrapped into the twister in the same vertical plane as that followed during the placing of the wire about the article.

The machine is now ready to be actuated for first tensioning, tying and then severing the tie. The operator may now grip the main operating handle 106 with his right hand and the auxiliary handle 116 with his left hand and swing the main handle 106 forwardly while at the same time swinging the auxiliary handle rearwardly. During the initial swing of the actuating handles, the reciprocating cross-head 43 will be moved forwardly from the position thereof, as shown in Fig. 3 to that of Fig. 5, by the action of the quadrant gears and the lost motion coupling means. The forward motion of the cross-head not only actuates the tensioning means through the toggle links 44 to draw the placed tie wire tightly about the article, but also acts to project the severing blades 160 and thereby the wire separating members 166.

It may be noted from Fig. 2 that the two ends 172 and 173 of the tie wire are held by the grippers above the portions 174 of the tie wire placed about the article. The tie wire ends 172 and 173 slope upwardly from the opposite ends of the twister pinion slot to their respective grippers, while the portions 174 of the tie wire slope downwardly from the opposite ends of the twister pinion slot to the corners of the article, and, therefore, the wire separating means may be easily and positively projected between each set of diverging tie wires near each side of the twister pinion. Thus, the ends 172 and 173 of the wire are caused to ride over the upper surface of the separator members 166 (note Fig. 14), and are thus held in position for the severing blades 160 to latch thereover and thereby more securely retain the placed tie wire in position for the twisting operation.

At the completion of the initial swing of the operating handles the tie wire will have been tensioned, the separating members projected between each end and its adjacent portion of the placed tie wire, and the severing blades latched over the tie wire ends.

During the return swing of the operating handles the twister mechanism will be brought into play, while due to the lost motion connection between the actuating means and the reciprocating cross-head the tensioning, separating and severing means may remain inactive, and finally after the wires have been twisted sufficiently to form a secure knot the tongue 124 of each dog will have traversed the lost motion slots 125 of the cross-head and thereupon cause the cross-head to move rearwardly and thereby retract the severing blades and separating means, unite the recessed portion of each severing blade, shear the tie wire end held thereby against the side face of the machine frame. As soon as the cutting action is completed and as the toggle locking effect of the toggle levers 44 will have been disrupted by the movement of the cross-head, the tension spring 50 will cause the tensioning means to snap the cross-head back to its initial starting position, the cross-head being free to so move due to the lost motion slots 125. The return of the cross-head to its initial starting position carries with it the tensioning, severing and separating means to their initial starting positions.

During the twisting of the tie wires to form the knot, the separating members 166 will remain between the separated wires at each end of the twister and thereby limit the length of the twist formed in the wires, and as a result thereof a tighter and more secure knot will be formed than would be the case if the same number of twists extended over a longer length of the wire.

During the return swing, the operating handles travel a little beyond their initial starting position to give the tie a slight over-twist. The over-travel of the handles, and thus the over-travel of the twister, may be accomplished by the provision of the cam surfaces 146 formed upon the back of the pawls 134 riding over the stop cam rollers 147, as has been previously described. The over-travel of the levers and twister may be noted in Fig. 6, wherein the twister slot stops in an upwardly directed position and, therefore, must be returned to the discharging position, as shown in Fig. 7, which return movement may be accomplished by the cam surfaces of the pawls 134 engaging with the cam stop rollers 147 to forcibly retain the pawls in driving engagement with the main twister driving gear 133 until the handles and twister are returned to the position, as illustrated in Fig. 7, wherein the pawls have just released the driving gears. At this point, the twister pinion slot will be directed downwardly, from which the tie will be snapped therefrom due to the tension of the tie wire.

Upon the disengagement of the pawls from the twister driving gears the stop surfaces 148 thereof will ride onto the stop rollers 147, while the end 140 of the cam blade will ride out of the twister control cam notch 143 onto the periphery thereof and thereby lock the main operating handle 106 from moving downwardly.

As soon as the wire tie has been snapped from the twister slot and the driving pawls 134 disengaged from the twister driving gears, the spring weighted cam lever 153 will act upon the high point of the retaining cam 150 to rotate the main twister driving gear and thereby to rotate the twister back to its initial starting position wherein the slot thereof will again be directed upwardly in the wrapping plane of the tie wire. At this point the rounded nose 154 of the cam lever 153 will seat in one or the other of the depressions of the retaining cam 150.

During the return movement of the gripper levers 33 and 34 the grippers thereof will engage the latch members 80 to be re-cocked thereby.

The tie is now completed and the machine reset for the making of another tie and thus be moved to a second position on the article if more than one tie is to be placed thereabout or moved to another article to be tied.

The operation of the machine is rapid, easy and automatic in performing the several functions in correctly timed relationship, and is automatically re-set for the next succeeding operation.

Figure 15:
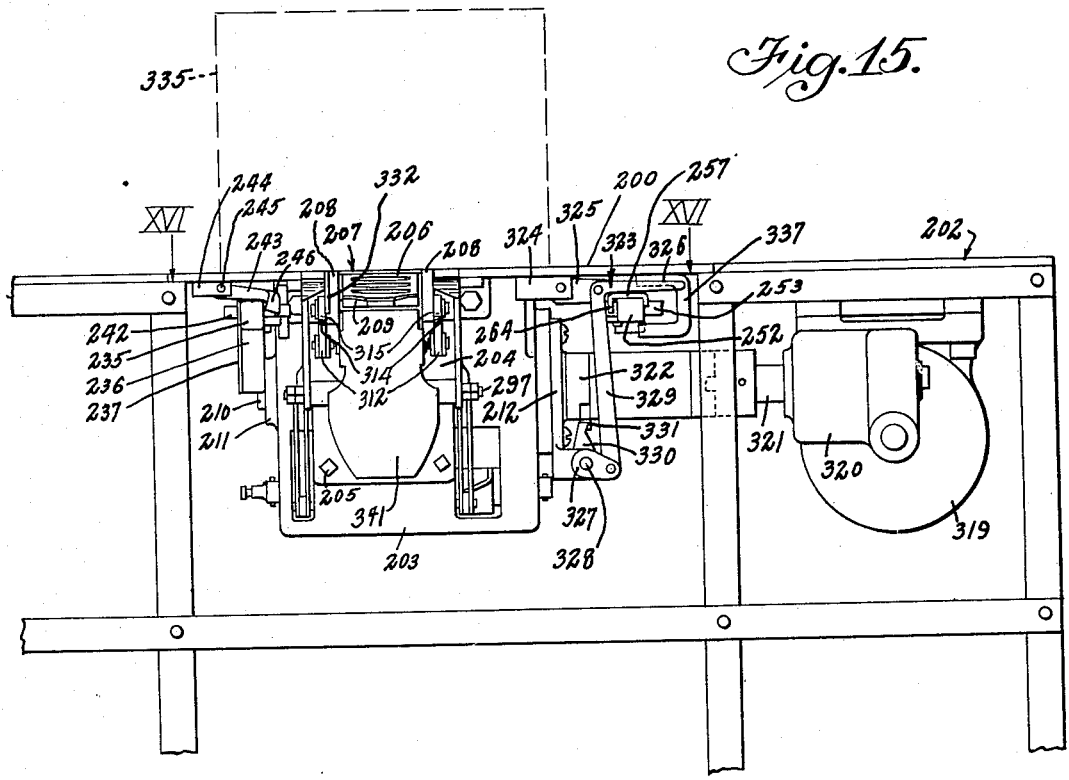
Figure 15 illustrates a front view of the stationary power driven type of wire tying machine of this invention.

The stationary wire tying machine is illustrated in Figures 15 to 20, inclusive. In Fig. 15 the machine is shown as mounted upon the under-surface of an appropriate metal bundle receiving plate 200, as by means of suitable countersunk screws 201 (note Figs. 17 and 16).

The bundle receiving plate may be mounted upon a suitable bench structure 202, and as the type of bench forms no part of the invention it need not be described in detail.

The machine frame 203 may be more or less of box construction for enclosing the major portion of the operating mechanisms of the machine and may be provided with the necessary bearings and bosses for operatively supporting the various parts thereof.

Figure 17:
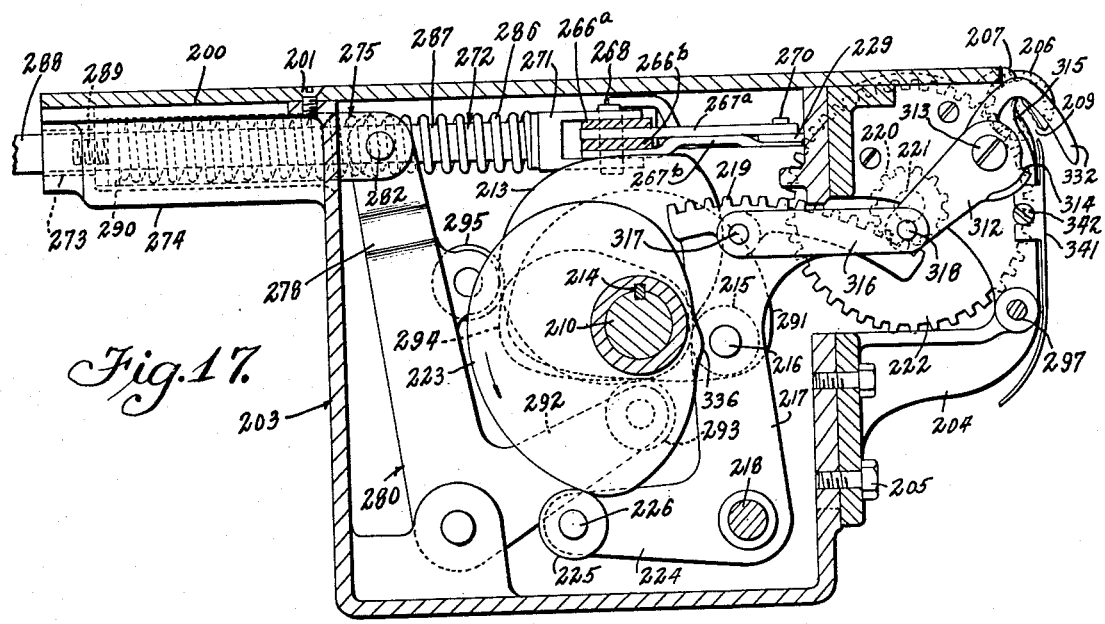
Figure 17 illustrates a cross-sectional view taken substantially in the plane of line XVII—XVII of Figure 16.

The front face of the machine frame may be provided with twister pinion housing 204. It will be appreciated that the twister pinion housing may be cast integral with the frame or formed of a separate casting securely fastened thereto, as by suitable screw means 205 (Fig. 17). The twister pinion 206 may be of substantially the same construction as described for the portable machine and may be operatively journaled in the housing 204 by a pair of spaced internal-external sectoral bearings, also of substantially the same construction as described for the portable model.

Figure 18:
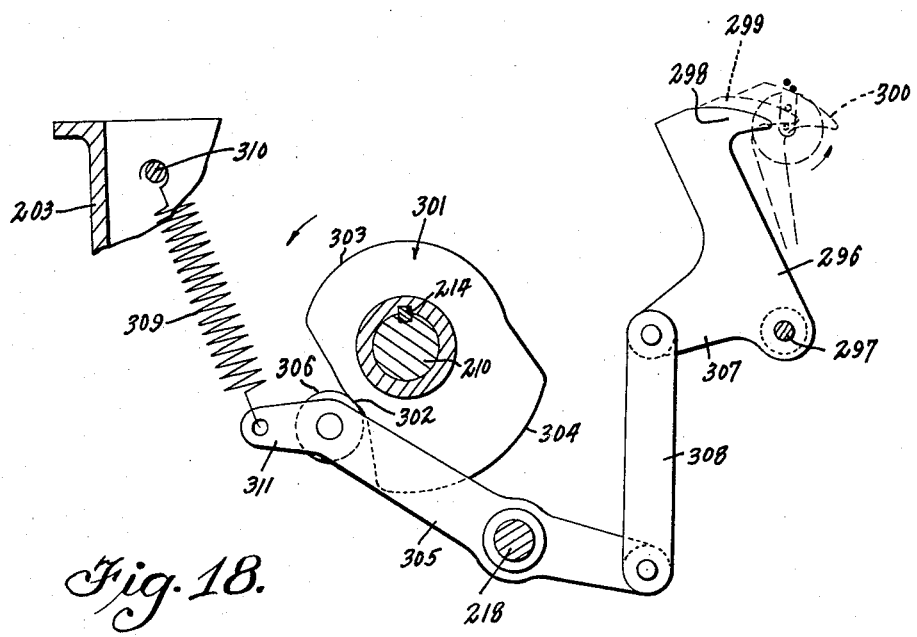
Figure 18 illustrates a fragmental sectional view taken substantially in the plane of line XVII—XVII of Figure 16, and depicts by full and broken lines one of the wire separating means in its retracted, separating and ejecting positions, and also the actuating mechanism therefor.

In Fig. 16 the external sectoral bearings are illustrated at 207, while the internal stud bearings may be carried by bearing plates 208, which plates may be appropriately fastened to the side faces of the twister housing 204 by means of screws, not shown. As may be noted from Figs. 15 and 16, due to the sectoral bearing mounting of the twister pinion, substantially the entire front half portion thereof may be projected from the twister housing 204 without any form of supporting means therefor. Because of this arrangement, the twister pinion slot 209 may be directed downwardly or away from the article being tied, whereby the tie wire may be easily and quickly wrapped therein during the wire placing or loading operation, and also after the completion of the tie the pinion may be turned toward the article for discharging the finished tie (Fig. 18).

Any appropriate means may be provided which preferably will function to retain the twister pinion in its loading position (Fig. 17) until the tie wire has been placed and tensioned and thereafter operable for rotating the pinion a predetermined number of revolutions to form the tie, and for rotating the pinion a given distance beyond the discharging position thereof to give the tie a desired amount of over-twist, and then operable for turning the pinion to its discharging position (Fig. 18) and after the tie has been severed and ejected for returning the twister pinion to its initial loading position. One form of such driving means may include operatively mounting in the machine frame a cam shaft 210 by means of bearings 211 and 212, and mounting thereon a twister pinion driving cam 213. The twister pinion cam may be forced to rotate with the cam shaft as by means of a suitable key 214. The motion derived from the twister cam may be transmitted to the twister pinion by means of the cam roller 215, journaled upon stub shaft 216 carried by a pair of bell crank levers 217, which levers may be journaled upon a cross shaft 218 supported in the frame. The upper end of the bell crank levers may be provided with gear quadrants 219 arranged to mesh with a pair of pinions 220 journaled upon the counter-shaft 221, which countershaft may be mounted in the pinion housing. Formed preferably integral with the pinions and intermediate thereof may be arranged a twister pinion driving gear 222, which gear may operatively mesh with the twister pinion 206.

By providing a spring means for retracting the bell crank levers a single cam may be utilized for fully actuating the twister pinion. However, the preferred embodiment may include, as illustrated in the drawings, a second or twister pinion retracting cam 223, mounted upon the cam shaft 210, and by extending the key means 214 made to rotate therewith, and by providing one of the bell crank levers 217 with a pair of rearwardly extending arms 224 (Figs. 17 and 16) for pivotally carrying the retracting cam roller 225, as by means of the pivot pin 226. By this two-cam arrangement, all of the movements of the twister pinion may be positively controlled.

The tensioning means may include a first gripper lever 227 pivotally mounted upon one of the upper edges of the frame, as by means of the pivot pin 228, and a second gripper lever 229 may be pivotally mounted to the bracket 230, as by means of the pivot pin 231. The bracket 230 may be cast integral with the main frame or formed of a separate casting and securely fastened thereto by suitable screw means 232.

The first gripper lever 227 may be formed of two separated plates separated so as to straddle the frame pivot pin boss at the rear end thereof and separated at the adjacent forward end thereof by means of a separating block 233 (Fig. 16), and each plate securely fastened thereto, as by means of the rivets 234. The forward end of the upper first gripper lever plate may be downwardly flanged (Figs. 16 and 15) to form a tie wire gripper anvil 235, while the lower first gripper plate may be downwardly flanged to form a wire guide 236 and a portion thereof flanged forwardly to form a stop guide 237 for the tie wire end.

A gripper 238 may be pivotally mounted between the two gripper lever plates just forwardly of the separator block 233, as by means of the pivot pin 239, and may be provided with an arcuate gripping surface 240, which surface may be serrated to more securely grip the tie wire against the gripper lever anvil 235. A spring means 241 may be provided for yieldingly urging the gripper 238 into gripping relation with the anvil, which spring may act between the separator block and the thumb piece 242 of the gripper. Means may be provided for releasably retaining the gripper 238 in its open or wire receiving position, as illustrated in Figs. 16 and 15. The gripper opening means may include a gravity latch 243, journaled at one end thereof to a suitable block 244, as by means of the pivot pin 245. The block 244 may be suitably mounted to the under-side of the bundle receiving plate 200 (Fig. 15). During the return swing of the first gripper lever to its starting position, the head 246 of the gravity latch will engage the shoulder 247 of the gripper and thereby rotate the gripper in a clockwise direction, as viewed in Fig. 16, to swing the gripping surface 240 thereof away from the gripping anvil 235. To release the gripper, the gravity latch may be raised until the head 246 thereof rises above the gripper shoulder 247, whereupon the spring means 241 will act to swing the gripper into gripping relation with the gripper lever anvil 235. Due to the position of the gripper pivot pin 239 with relation to the arcuate gripping surface 240, the greater the pull upon the tie wire, the more tightly will be the gripping action thereof.

Figure 19:
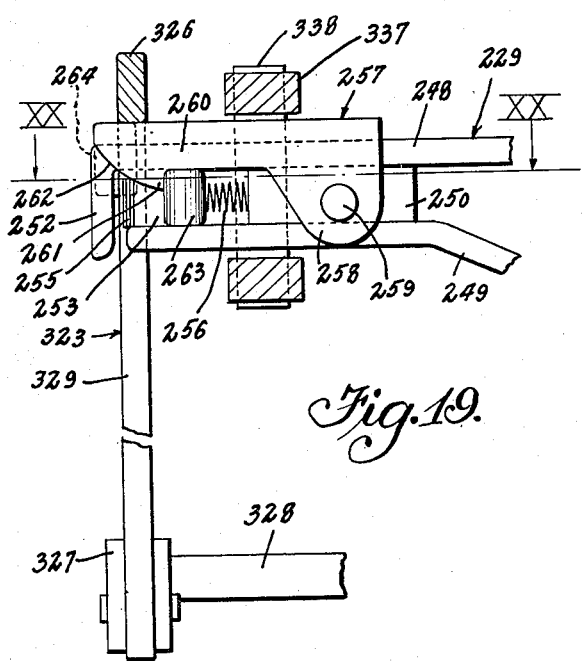
Figure 19 illustrates an enlarged fragmental view taken substantially in the plane of line XIX—XIX of Figure 16.
Figure 20:
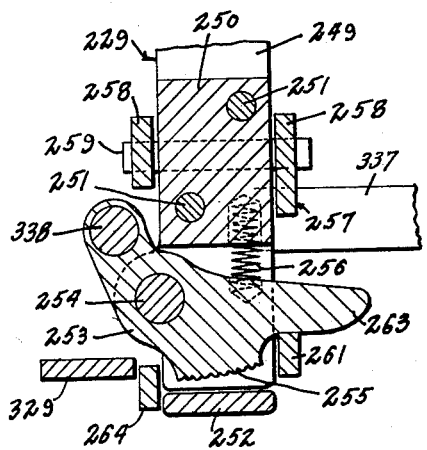
Figure 20 illustrates a sectional view taken substantially in the plane of line XX—XX of Figure 19.

The second gripping lever 229 may be likewise formed of two separated plates 248 and 249 (Fig. 19) and provided adjacent the forward ends thereof with a separator block 250, which separator block may be securely fastened between the two plates, as by means of rivets 251. The forward end of the upper plate 248 may be extended beyond the end of the lower plate and be bent downwardly to form a wire gripping anvil 252 (Figs. 19 and 20). A wire gripper 253 may be journaled between the plates in the space formed between the separating block 250 and the anvil 252, as by means of the pivot pin 254. The gripper 253 may be provided with an arcuate gripping surface 255, preferably serrated and positioned to cooperate with the anvil 252 for securely gripping the end of the tie wire placed therebetween, and so arranged as to resist the tendency of the wire to slip therethrough during the tensioning operation.

A spring means 256 may be provided for yieldingly urging the gripper into gripping relation with the anvil. A latch means 257 may overlie the upper gripper lever plate 248 and may have downwardly flanged ears 258 for receiving the pivot pin 259, which pin may be horizontally mounted in and extending through the separating block 250. The side flange 260, which may be a continuation of the outer flanged ear may be provided with a latching shoulder 261, from which the side flange may gradually taper, as at 262, to the forward end thereof. When the gripper has been rotated to its retracted or open position (Figs. 19 and 20), the shoulder 261 of latching member will drop over the thumb piece 263 and thereby retain the gripper open. It is desirable to provide means for releasing the gripper for gripping the end of the placed tie wire as soon as the end thereof has been moved between the gripping surface 255 and anvil 252, which means may include flanging the forward inner end of the latching member to provide a tripping lug 264. As may be noted from Figs. 19 and 20, the tripping lug may be positioned in alignment with the wire receiving space formed between the gripper and anvil whereby during the placing of the tie wire in the gripper the wire will engage and lift the tripping lug and thereby the latching member until finally the shoulder 261 thereof will be lifted clear of the gripper thumb piece 263 and will thus release the gripper for engagement with the placed tie wire. The second wire gripper may be automatically re-set by means later to be described.

Means may be provided for swinging the gripper ends of the gripper levers apart and to thereby tightly tension the tie wire about the article to be tied. In Fig. 16 the gripper levers 227 and 229 are illustrated by full lines in their normally retracted positions and by broken lines in their fully extended positions. The means for swinging the gripper levers apart may include a pair of interconnected toggle links 266 and 267 pivotally connected together by the pivot pin 268, while the free end of the toggle link 266 may be pivotally connected to the gripper lever 227 intermediate the end thereof, as by means of the pivot pin 269, and the free end of the toggle link 267 may be pivotally connected to the gripper lever 229 intermediate the end thereof, as by means of the pivot pin 270.

Each toggle link may be formed of two superimposed plates, as, for example, 266a—266b and 267a—267b for the purpose of making these links more rigid and for equalizing the load upon the pivot pins and thereby reducing the bending tendency thereof. A yoke 271 may be pivotally mounted upon the interconnecting pivot pin 268 of the toggle levers and arranged whereby the prongs of the yoke may straddle the several plates forming the links. A plunger 272 may be secured to or formed integral with the yoke and may extend rearwardly, and finally loosely pass through the plunger bore 273 formed through the rear end of the rearwardly extended portion 274 of the machine frame. A more or less U shaped cross-head 275 may be loosely mounted upon the plunger, as at 276, while the forward ends 277 thereof may be pivotally connected to the upper ends 278 and 279 of a pair of actuating bell-crank levers 280 and 281, as by means of the pivot pins 282—283. For the sake of stiffness the forward ends of the cross-head may be provided with bracing members 284, which members may be suitably fastened thereto, as by means of rivets 285, and also pivotally mounted upon the pivot pins 282—283.

A coiled spring 286 may be loosely mounted upon the plunger and of such length as to be given an initial compression when mounted between the cross-head 275 and the yoke 271 to thereby predetermine the tension placed in the tie wire during the tensioning operation. In order to maintain the compression in the spring the plunger may be formed of two parts 287—288 and screw-threaded together, as at 289, and the rear portion 288 thereof provided with a collar 290, against which the spring will normally retain the cross-head. The forward movement of the cross-head will act against the rear end of the spring, and due to the initial compression of the spring the plunger yoke 271 will be moved forwardly until the resistance of the tie wire to further tension exceeds the compressive force of the spring, whereupon further forwardly movement of the cross-head will act to further compress the spring. The compressive force of the spring is selected to give to the tie wire a predetermined degree of tension.

A tensioning cam 291 (Figs. 16 and 17) may be mounted upon the cam shaft 210 and caused to rotate therewith by the key means 214. Each of the bell crank levers may be provided with a forwardly directed lever arm 292 operatively carrying therebetween and at the forward ends thereof a cam roller 293 (Fig. 17) adapted to be actuated by the tensioning cam 291 for, in turn, actuating the bell-crank levers and thereby the cross-head 275. Any appropriate means may be provided for returning the bell-crank levers to their retracted positions, as, for example, a bell-crank retracting cam 294 may be mounted and keyed upon the cam shaft 210 and a cam roller 295 may be operatively carried by the bell-crank lever 281 (Figs. 16 and 17) in position to be actuated by the retracting cam to return the bell-crank lever and thereby the tensioning mechanism to their initial starting positions.

By reference to Fig. 17, it may be observed that during substantially the first quarter turn of the cam shaft 210 from its starting position as shown in this figure, the tensioning cam 291 at the point of contact of the cam roller 293 will rotate from a point thereon of minimum radius to a point thereon of maximum radius, while the retracting cam 294 at the point of engagement with the cam roller 295 will rotate from a maximum to a minimum radius, whereby the bell-crank levers will be rotated to actuate the tension mechanism; and during substantially the next half turn of the cam shaft 210 the cam roller 293 will ride over the sector of the tensioning cam of constant maximum radius, while the cam roller 295 will ride over the sector of the retracting cam of constant minimum radius. Thus, the tensioning means will be maintained during this period in the tensioning position. Finally, during substantially the last quarter turn of the cam shaft 210, the cam roller 293 will ride from the maximum to the minimum radius of the tensioning cam 291, while the cam roller 295 will ride from the minimum to the maximum radius of the retracting cam 294 and thereby swing the bell-crank levers back to their initial starting positions.

It is advantageous to provide means for predetermining the length and thereby the tightness of the twists placed in the tie wires during the tying operation. It is also advantageous to make these means retractable in order that the tie wire may be easily and quickly wrapped into the twister slot, about article to be tied and again through the twister slot without the necessity of threading the tie wire into or weaving the tie wire about the means for limiting the length of twist. These means may include a wire separator located adjacent each end of the twister means and spaced apart sufficiently to permit the predetermined number of twists to be turned into the placed tie wire tightly, but not so close as to cause the breakage thereof due to attempting to wind the twists of the tie too tightly.

The two tie wire separators may be identical and, therefore, one only will be described. The separator means may be made in a number of different forms of construction, but a very satisfactory simple form thereof has been illustrated in detail in Fig. 18, wherein the separator 296 may take the form of a lever pivotally mounted upon the side of the twister housing 204 by means of the cross shaft 297, and may be provided with a forwardly directed wire separating wedge 298. The separator means may be also utilized as a tie ejector operable upon the completion of the tying operation for forcibly ejecting the tie from the twister slot. In Fig. 18 the separator 296 is illustrated by full lines in its normally retracted position. The separator is retained in this position during the tie wire placing operation so as not to interfere therewith. When the separator 296 has been swung forwardly to the position thereof, as indicated by the broken lines 299, the placed tie wires will be separated by the separating wedge 298 thereof. The separator should be retained in this position during the tie wire twisting operation and thus limit the length of the tie and to make certain that the tie will be twisted sufficiently tight to insure the formation of a secure knot. After the completion of the tying operation, the separator may be again moved forwardly to the broken line position 300, whereupon the upper surface of the separating wedge will act to forcibly eject the completed tie from the twister slot. It will be understood that the held ends of the tie wire will have been severed before the ejection action takes place.

Any form of suitable actuating means may be provided for operating the separator, as, for example, a separator cam 301 may be mounted and keyed upon the cam shaft 210, which cam may have a peripheral cam surface of minimum radius, as at 302, for retaining the separator in its retracted position, a cam surface of medial radius, as at 303, for actuating and retaining the separator in its tie wire separating position, and a cam surface of maximum radius, as at 304, for actuating the separator to the tie ejecting position. The means for transmitting the motion produced by the separator cam may include a cam lever 305 pivotally journaled upon the cross-shaft 218 and operatively carrying adjacent one end thereof a cam roller 306, while the other end thereof may be operatively connected to the lever arm 307 of the separator 296, as by means of a suitable connecting rod 308. A spring means 309 may act between the machine frame, as at 310, and the end 311 of the cam lever for resiliently maintaining the cam roller 306 in operative engagement with the cam 301 and thus be operable for retracting the separator during that portion of the rotation of the cam during which the cam roller 306 will travel from the maximum cam surface 304 to the minimum cam surface 302.

Means may be provided for severing the surplus tie wire ends from the completed tie. The separating means function to separate the held ends of the tie wire from the article encircling portions thereof, and as these held ends become surplus material upon the completion of the tie it is desirable to sever them from the tie as closely as possible. Also, where the tie wire is taken from an uncut supply, such as a roll, it is desirable to sever the tie from this supply, which may be nicely done by the severing means.

A severing means may be mounted upon each side of the twister housing 204 and may cooperate with the sides of the housing or with the outer face of the internal sectoral bearings for shearing off the surplus ends of the tie. As each severing means may be identical, only one will be described.

As illustrated in Fig. 17, the severing means may include a swinging cutter 312 pivotally mounted upon the side of the twister housing, as by suitable screw means 313, and the pivoted end thereof having a concentric rounded end of such radius as to be retracted from the twister slot 209 so as not to interfere with the tie wire during the placing operation.

The swinging cutter may be provided with a shearing edge 314 projecting from the side thereof and of such size as to be clear of the tie wire wrapping plane when retained in its retracted position, as illustrated in Fig. 17. During the wire twisting operation, the cutter 312 may be swung until finally at substantially the completion thereof the shearing edge 314 will be swung past the cooperating shearing edge 315 of the internal sectoral bearing (Fig. 17). The surplus end of the tie wire will be retained in position by the adjacent separating means for engagement by the shearing edge 314 of the cutter and thus be sheared off as the edge 314 swings past the cooperating edge 315.

The severing means may be actuated from the bell-crank lever 217, as by means of a suitable connecting link 316 pivotally connected at one end to the bell-crank lever 217, as by a suitable pin means 317, and to the free end of the swinging cutter 312, as by the pivot pin 318. It will be remembered that the bell-crank levers 217 actuate the twister mechanism and, therefore, by actuating the severing means therefrom these means may be actuated in correctly timed relation therewith.

Any suitable form of driving means may be provided for actuating the cam shaft 210 and thereby all of the operating mechanisms of the machine.

In Fig. 15 there is illustrated one form of driving means, which may include an electric motor 319 mounted upon the underside of the bench top and provided with a standard form of reduction gear 320. The driving shaft 321 of the reduction gear may be in alignment with the cam shaft 210 and operatively connectable therewith by means of a common form of one revolution clutch 322. Means may be provided for actuating the clutch into driving engagement, which means may be preferably arranged to be automatically actuated upon the completion of the wire placing operation. The clutch control means may include a tripping lever 323 pivotally mounted to a suitable bracket 324 by means of link 325. The bracket 324 may be fastened to the under side of the article receiving plate 200.

The horizontal arm 326 of the tripping lever may overlie the latch means 257 and be actuated thereby when the latch means is lifted during the placing of the tie wire in the second gripper at the completion of the wire placing operation. The lifting motion given to the tripping lever may be communicated to the outer end of the crank arm 327 mounted upon the forward end of the clutch control shaft 328 by means of the tripping lever leg 329. The rotation of the clutch control shaft will cause the releasing lever 330 to release the clutch pawl 331 and thereby to permit the clutch to engage and drive the cam shaft through one complete revolution, whereupon the clutch will be disengaged by means later to be described.

The operation of the stationary power driven tying machine may be briefly stated as follows: An article 335 (Fig. 15) may be slid along the top of the bench until located over the tying machine and then moved backward or forward to locate the portion of the article around which the tie is to be made directly over the twister pinion 206. A length of tie wire may next be uncoiled from the tie wire supply reel, not shown, and the end thereof placed in the first gripper, during which placing of the tie wire end the operator may lift the gravity latch 243 to release the gripper 238 for securely gripping the tie wire end, whereupon the tie wire may be easily and quickly wrapped first into the twister slot 209 and then around article 335 back into the twister slot, and finally into the second wire gripper, whereupon the machine will be automatically set into operation, as previously described. It should be noted that during the wire placing operation the twister slot is directed downwardly or away from the article and in position to directly receive the tie wire, or, in other words, the twister pinion slot is directed toward the plane in which the tie wire is wrapped and not at right angles thereto, as in the ordinary tying machine of this type. It also should be noted that during the wire placing operation that the wire separating and severing means are retained retracted to thus remove all hindrances from the tie wire wrapping plane. Note also that in this machine it is unnecessary to thread the tie wire twice into the usual wire guiding means, which are always directed at substantially right angles to the tying plane and, therefore, requiring a movement of the tie wire out of the wrapping plane.

It is desirable to provide means for preventing the tie wires from jumping out of the twister slot during the first turn thereof, and for this purpose one or both of the swinging cutter blades 312 may be provided with a hook 332 having the opening thereof directed in substantially the same plane as that of the twister slot and rotated with the cutter 312 to swing the hook clear of the slot upon the completion of the twisting operation to permit the tie to be ejected toward the article. As soon as the clutch has been released, the cam shaft will be rotated thereby through one complete revolution and then stop for the next tying operation.

The first quarter turn of the cam shaft actuates the tie wire tensioning means, as has been previously described, and also actuates the wire separating means for projecting the separating wedges 298 between the held and placed strands of the tie wire. During substantially the next half turn of the cam shaft the sector of the twister actuating cam 291 having a gradually increasing radius is carried past the cam roller 215, and thus the bell-crank levers 217 will be swung forwardly to in turn forwardly swing the gear quadrant 219 and thereby rotate the twister driving gears. The motion of the gear quadrant and the twister driving gears are so related as to rotate the twister pinion through substantially four complete revolutions and thus substantially a half revolution past the discharging position of the twister to give the twist a predetermined amount of over-twist. It is now desirable to rotate the twister pinion in the reverse direction sufficiently to turn the slot thereof toward the article for the discharging of the completed tie and for this purpose the twister retracting cam 223 may be provided with a hump 336, which at this point will engage the cam roller 225 to swing the bell-crank lever 217, and thereby the gear quadrant 219 back sufficiently to turn the twister back from its over-twist to its discharging position. The hump 336 of the retracting cam may also permit the twister to dwell momentarily in the discharging position to allow sufficient time for the completed tie to be ejected from the slot thereof. The forward swing of the bell-crank levers 217 actuate the swinging cutter blades, as has been previously described, so as to sever the separated surplus ends of the tie wire at about the completion of the tying operation. During the backward rotation of the twister pinion from the over-twist to the discharging positions thereof the separator actuating cams 301 will function to swing the separators to their tie ejecting positions, as illustrated by the broken lines 380 of Fig. 18, and thus the completed and severed tie will be forcibly ejected from the twister slot.

During substantially the last quarter turn of the cam shaft all of the actuating mechanism will be returned to their initial starting positions.

The clutch control mechanism and the second gripper may be re-set automatically upon the severing of the completed tie. During the tensioning operation the spring 286 of the tensioning means will be more or less compressed, whereby as soon as the tensioned tie wires are severed the spring will cause the yoke 271 to jump forwardly and thereby spread the gripper levers 227 and 229 to their maximum positions, whereupon the legs of the U shaped stop member 337 will straddle the second gripper lever adjacent the outer end thereof and against which the second gripper re-setting pin 338 will engage and thus swing the second gripper 253 to its open position, whereupon the latching member will latch over the thumb piece 263 to lock the gripper open. The dropping of the latching means 257 over the re-set gripper will permit the clutch control mechanism to return to engage and release the clutch pawl. A common torsional spring 339 (Fig. 16) may be provided upon the clutch control shaft 329 for assisting in return of the clutch control mechanism to its clutch engaging position.

In order to cushion the forward movement of the tensioning means upon the severing of the tie a shock-absorbing spring means 340 may be mounted upon the rear end of the plunger.

A pressed metal guard plate 341 may be flanged at the sides thereof and thereby fastened to the sides of the twister pinion housing 204, as by suitable screw means 342. The guard plate may not only form a front cover for the pinion housing, but also may be shaped to act as a guide for directing the tie wires into the twister slot.

Having fully described the invention, it is to be understood that it is not to be limited to the details herein set forth, but the invention is of the full scope of the appended claims.

I claim:

1. In a wire tying machine, a frame, a slotted twister means having different angular positions for loading and discharging, and bearing means carried by the frame for operatively supporting the twister means, said bearing means operatively engaging the twister means within a sector thereof equal to or less than the sector lying between the adjacent side of the twister slot when located at the loading position and the adjacent side of the twister slot when located at the discharging position.

2. In a wire tying machine, a frame, a slotted twister means having different positions for loading and discharging, and internal-external bearing means carried by the frame for operatively supporting the twister means, said bearing means operatively engaging the twister means within a sector thereof equal to or less than the sector lying between the adjacent side of the twister slot when located at the loading position and the adjacent side of the twister slot when located at the discharging position.

3. In a wire tying machine, a frame, a slotted twister means having different positions for loading and discharging, an external bearing carried by the frame for journally supporting the peripheral surface of the twister means within a sector thereof equal to or less than the sector lying between the adjacent side of the twister slot when located at the loading position and the adjacent side of the twister slot when located at the discharging position, and a pair of spaced internal stud bearings carried by the frame for journally supporting each end of the twister means within a sector thereof equal to or less than the sector lying between the adjacent side of the twister slot when located at the loading position and the adjacent side of the twister slot when located at the discharging position.

4. In a wire tying machine, a frame, a slotted twister means having different positions for loading and discharging, and a pair of spaced external bearings carried by the frame for operatively supporting the peripheral surface of the twister means within a sector thereof equal to or less than the sector lying between the adjacent side of the twister slot when located at the loading position and the adjacent side of the twister slot when located at the discharging position.

5. In a wire tying machine, a frame, a slotted twister means having different positions for loading and discharge, and a pair of spaced internal stud bearings carried by the frame for operatively supporting each end of the twister means within a sector thereof equal to or less than the sector lying between the adjacent side of the twister slot when located at the loading position and the adjacent side of the twister slot when located at the discharging position.

6. In a wire tying machine, a frame, a twister means operatively mounted thereon, a wire separating means operatively carried by said frame adjacent each end of said twisting means, and means operative after the wire placing operation for projecting the separating means between the placed wire strands and operative substantially at the completion of the tying operation for retracting said separating means.

7. In a wire tying machine, a frame, a slotted twister means operatively mounted thereon and having the slot thereof directed when located in the loading position for the wrapping of the tie wire directly therein during the wire placing operation, a wire separating means operatively mounted upon the frame adjacent each end of the twister, and an actuating means operable for retaining the separating means retracted from the wrapping plane of the tie wire during the placing of the same and operable thereafter for projecting the separating means across said wrapping plane for separating the placed tie wires and thereby limiting the length of twist formed in the tie wire by the operation of the twister means.

8. In a wire tying machine, a frame, a slotted twister means operatively mounted thereon and having the slot thereof directed when located in the loading position for the wrapping of the tie wire directly therein during the wire placing operation, a wire separating means operatively mounted upon the frame adjacent each end of the twister, and an actuating means operable for retaining the separating means retracted from the wrapping plane of the tie wire during the placing of the same and thereafter operable for projecting the separating means across said wrapping plane for separating and thereby limiting the length of twist formed in the tie wire by the operation of the twister means and further operable upon the completion of the tie for actuating the separating means for ejecting the completed tie from the twister means.

9. In a wire tying machine, a frame, a twister means operatively mounted thereon, a wire separating means operatively mounted upon the frame adjacent each end of said twisting means for limiting the length of twist formed in the tie during the tying operation, and an actuating means operable upon the completion of the tie for actuating said separating means for ejecting the completed tie from the twister means.

10. In a wire tying machine, a frame, a twister means operatively carried thereby, a separating means operatively mounted upon the frame for predetermining the length of the tie formed during the tying operation, an actuating handle operatively mounted upon the frame, means operable by the handle for projecting the separating means between the placed tie wire strands, means operable by the handle for actuating the twister means, and means operable upon the completion of the tie for returning the separating and twisting means to their initial positions.

11. In a wire tying machine in which the tie wire is manually placed, a frame, sectoral bearing means carried thereby, a slotted twister means operatively mounted in the sectoral bearing means and having the slot thereof directed away from the article to be tied during the wire placing operation for the direct wrapping of the tie wire therein, and means for actuating the twister for forming the tie and upon completion of the tie for directing the twister slot toward the article for discharging the completed tie.

12. In a wire tying machine, a frame, a twister means operatively carried thereby, a retractible wire separating means operatively carried by the frame adjacent each end of the twister means, severing means operatively carried by the frame and arranged to engage the separated surplus tie wire ends, and means for actuating the twister, separating and severing means in timed relation.

13. In a wire tying machine, a frame, a twister means operatively carried thereby, a separating means operatively mounted on the frame adjacent each end of said twister means, said separating means being normally retained in their retracted positions during the wire placing operation and operable thereafter for separating the placed strands of the tie wire for predetermining the length of twist formed in the tie, severing means operatively carried by the frame and arranged to sever the separated surplus tie wire ends upon completion of the tie, a gripper means carried by said frame adjacent each of said separating means for retaining the tie wire ends, and means for actuating the twister, separating and severing means.

14. In a wire tying machine, a frame, a twister means operatively carried thereby, a separating means carried by said frame adjacent each end of said twister for predetermining the length of tie, latching and severing means operatively carried by the frame for retaining the placed wire strands in tying position and upon completion of the tie for severing the separated surplus ends thereof, and a driving means for actuating the twister and the latching and severing means in timed relation.

15. In a wire tying machine, a frame, a twister means operatively carried thereby, a first gripper means operatively carried by the frame adjacent one end of the twister means for gripping the initial end of the tie wire, a second gripper means operatively carried by the frame adjacent the other end of the twister means for gripping the other end of the placed tie wire, a retractible separating means operatively carried by the frame intermediate each gripper means and the adjacent end of the twister for predetermining the length of twist, and a driving means operable for moving the gripping means apart while projecting the separating means between the gripped and article encircling portions of the tie wire and thereafter actuating the twister means.

16. A wire tying machine including a frame, a twister means operatively carried thereby, a first gripper means operatively carried by the frame adjacent one end of the twister means for gripping the initial end of the tie wire, a second gripper means operatively carried by the frame adjacent the other end of the twister means for gripping the other end of the placed tie wire, a retractible separating means operatively carried by the frame intermediate each of the gripper means and the adjacent end of the twister for predetermining the length of twist, a severing means operatively carried by the frame adjacent each end of the twister means and operable for severing the gripped ends of the tie wire at substantially the completion of the tying operation, and a driving means operable for moving the gripping means apart while projecting the separating means between the gripped and article encircling portions of the tie wire and thereafter actuating the twister and severing means.

17. In a wire tying machine, a frame, a main operating handle operatively mounted thereon and provided with a driving gear segment, an auxiliary operating handle operatively mounted upon the frame, said auxiliary handle carrying a driven segmental gear operatively meshing with said driving gear segment, a cross head reciprocally mounted in said frame, means for operatively coupling the cross head with the driven segmental gear, a pair of spaced and oppositely disposed wire gripper levers, an anchor link for pivotally connecting each of said gripper levers intermediate the ends thereof to the frame, a toggle link for pivotally connecting each of said gripper levers intermediate the ends thereof to said cross head, a tension spring acting between the rear ends of said gripped levers, spacer means for limiting the extent to which the rear ends of said gripper levers may be drawn together under the action of said tension spring, and wire gripping means carried by the forward end of each gripper lever.

18. In a wire tying machine, a frame, a cross head reciprocally mounted therein, means for reciprocating said cross head, a pair of spaced and oppositely disposed wire gripping levers, an anchor link for pivotally connecting each of said gripper levers intermediate the ends thereof to the frame, a toggle link for pivotally connecting each of said gripper levers intermediate the ends thereof to said cross head, a tension spring acting between the rear ends of said gripper levers, and wire gripping means carried by the forward end of each gripper lever.

19. In a wire tying machine, a frame, a cross head reciprocally mounted thereon, means for reciprocating said cross head, a pair of spaced and oppositely disposed tie wire gripping levers, an anchor link for pivotally connecting each of said gripper levers intermediate the ends thereof to the frame, a toggle link for pivotally connecting each of said gripper levers intermediate the ends thereof to said cross head, a tension spring means acting between the rear ends of said gripper levers, spacer means for limiting the extent to which the rear ends of the gripping levers may be drawn together under the action of said tension spring means, and a wire gripping means carried by the forward end of each of said gripper levers.

20. In a wire tying machine, a frame, a cross head reciprocally mounted therein, means including a lost motion means for reciprocating said cross head, a pair of spaced and oppositely disposed wire gripping levers, an anchor link for pivotally connecting each of said gripper levers intermediate the ends thereof to the frame, a toggle link for pivotally connecting each of said gripper levers intermediate the ends thereof to said cross head, spring tension means for yieldingly retaining the gripper levers in their retracted positions, and wire gripping means carried by the forward end of each gripper lever.

21. In a wire tying machine, a frame, a cross head reciprocally mounted therein, means for reciprocating said cross head, a pair of spaced gripping levers pivotally mounted at the rear ends thereof to the frame, a pair of toggle links pivotally interconnected at one end and each operatively connected at the other end to one of the gripping levers, spring means operatively connecting the cross head to the interconnected ends of the toggle links, and wire gripping means carried by the forward end of each gripper lever.

22. In a wire tying machine, a frame, an oscillatory operating handle journaled thereon, gear means journaled upon the frame in concentric relation to said handle, a pawl means pivotally mounted on the handle, means for yieldingly urging said pawl into engagement with said gear, automatic means for retaining said pawl out of engagement with said gear during the forward swing of said handle and for releasing said pawl to engage and rotate said gear during the rearward swing of said handle, and wire twisting means actuated by said gear means.

23. In a wire tying machine, a frame, an oscillatory operating handle journaled thereon, a stop means carried by the frame, for normally retaining said handle in the starting position, gear means journaled upon the frame in concentric relation to said handle, a pawl means pivotally mounted on the handle, means for yieldingly urging said pawl into engagement with said gear, means for retaining said pawl out of engagement with said gear during the forward swing of said handle and for releasing said pawl to engage and rotate said gear during the rearward swing of said handle, means for rendering said stop means ineffective for permitting the handle to swing a predetermined distance therepast, means for retaining said pawl means in engagement with said gear means during the return swing of the handle to its initial starting position and thereafter for releasing the pawl means for engagement with the stop means.

24. In a wire tying machine, a frame, an oscillatory operating handle operatively journaled thereon, gear means journaled upon the frame in concentric relation with the operating handle, a twister means operatively mounted on the frame and actuated by the gear means, pawl means operatively mounted upon the handle and having a stop face, stop means carried by the frame and positioned to be engaged by the stop face of the pawl means only when the pawl means are disengaged from the gear means for retaining the operating handle in the starting position, control means for retaining the pawl means disengaged from the gear means during the forward swing of the operating handle and operative upon the return swing thereof for actuating the pawl means into driving engagement with the gear means and while so engaged the stop face of the pawl means will be carried by the operating handle a given distance beyond the stop means for giving the tie a predetermined amount of overtwist, and said stop means being arranged for forcibly retaining the pawl means in driving engagement with the gear means until the operating handle will have been returned to the starting position thereof for actuating the twister means to the discharge position, whereupon the pawl means will be disengaged from the gear means and the stop face thereof brought into engagement with the stop means.

25. In a wire tying machine, a frame, an oscillatory operating handle journaled thereon, gear means journaled upon the frame in concentric relation with said handle, means for yieldingly retaining said gear means against rotation, pawl means operatively mounted upon the handle, automatic control means for retaining the pawl means disengaged from the gear means during the forward swing of the operating handle and operative upon the return swing thereof for actuating the pawl means into driving engagement with the gear means, and a wire twister means actuated by the gear means.

26. In a wire tying machine, a frame, an oscillatory operating handle journaled thereon, gear means journaled upon the frame, a twister means operatively mounted on the frame and operable by the gear means and having different positions for loading and discharging, means for yieldingly retaining the gear means against rotation and thereby retaining the twister means in the loading position thereof, pawl means operatively carried by the handle and having a stop face, stop means carried by the frame and positioned to be engaged by the stop face of the pawl means only when the pawl means are disengaged from the gear means for retaining the operating handle in the starting position, control means for retaining the pawl means disengaged from the gear means during the forward swing of the operating handle and operable upon the back swing thereof for actuating the pawl means into driving engagement with the gear means, said pawl means having a cam surface arranged to cooperate with the stop means for locking the pawl means in driving engagement with the gear means as the pawl means are carried by the operating handle a given distance beyond the stop means for giving the tie a predetermined amount of overtwist, said control means being operable after the operating handle has been swung forwardly for turning the twister means to the discharging position for disengaging the pawl means from the gear means and engaging the stop face of the pawl means with the stop means, and said yieldable gear retaining means being operable upon the disengagement of the pawl means for rotating the gear means for turning the twister means from the discharging position to the loading position thereof.

27. In a wire tying machine, a frame, a pair of sectoral bearings carried thereby, a slotted twister pinion operatively mounted in said bearings and having different positions for loading and discharging, gear means operatively mounted upon the frame for rotating the twister pinion, actuating means engageable with the gear means for turning said gear means and thereby the twister pinion a predetermined number of revolutions in one direction and releasable from the gear means after turning said gear means in the reverse direction sufficiently for rotating the twister pinion to the discharging position thereof, and means operable upon release of the actuating means for turning the gear means and thereby the twister pinion from the discharging to the loading positions thereof.

28. In a power driven wire tying machine, a driving shaft, a driven shaft, a one revolution clutch operatively mounted between said shafts and a clutch-actuating mechanism operable by the tie wire upon the completion of the placing operation thereof.

29. In a power driven wire tying machine, a driving shaft, a driven shaft, a one revolution clutch operatively mounted between said shafts, a clutch-actuating mechanism operable by the tie wire upon the completion of the placing operation thereof, and means for resetting the clutch-actuating mechanism during the operating cycle of the machine.

30. In a wire tying machine, a frame, a slotted twister means operatively mounted thereon and having different positions for loading and discharging, a wire severing means operatively mounted upon the frame adjacent each end of the twister means, a hook means carried by one or both of the severing means and arranged to register with the loading position of the twister slot for retaining the placed tie wires therein, a driving mechanism for rotating the twister means for forming the tie and arranged for stopping the twister with the slot thereof located in the discharging position, and means operable by the driving mechanism for actuating the severing means for cutting off the surplus tie wire ends and for actuating the hook means thereof to permit the ejection of the tie from the twister slot while located in the discharging position.

31. In a wire tying machine, a frame, a slotted twister means operatively mounted thereon and having different positions for loading and discharging, a wire severing means operatively mounted upon the frame adjacent each end of the twister means, a tie wire separating means operatively mounted on the frame adjacent each severing means, a driving mechanism for rotating the twister means for forming the tie and arranged for stopping the twister with the slot thereof located in the discharging position, means operable by the driving mechanism for actuating the severing means for cutting off the surplus tie wire ends, and means operable by the driving mechanism for actuating the separating means between the placed wire strands prior to the tying operation and operable while the twister slot is located in the discharging position for actuating the separating means for forcibly ejecting the completed tie therefrom.

32. In a wire tying machine, a frame, a twister means operatively mounted thereon, wire-engaging means operatively mounted upon the frame, and means operable for retaining the wire-engaging means in its retracted position during the tie wire placing operation, and operable thereafter for projecting the said means into engagement with the placed tie wires for limiting the length of tie formed therein during the operation of the twister means.

HERBERT HARVEY.